(12) United States Patent
Perreault et al.

(10) Patent No.: US 10,075,064 B2
(45) Date of Patent: Sep. 11, 2018

(54) HIGH-FREQUENCY, HIGH DENSITY POWER FACTOR CORRECTION CONVERSION FOR UNIVERSAL INPUT GRID INTERFACE

(71) Applicant: Massachusetts Institute of Technology, Cambridge, MA (US)

(72) Inventors: David J. Perreault, Andover, MA (US); Khurram K. Afridi, Boulder, CO (US); Juan A. Santiago-Gonzalez, Cambridge, MA (US); David M. Otten, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 57 days.

(21) Appl. No.: 14/791,685

(22) Filed: Jul. 6, 2015

(65) Prior Publication Data
US 2016/0006365 A1 Jan. 7, 2016

Related U.S. Application Data

(60) Provisional application No. 62/020,472, filed on Jul. 3, 2014.

(51) Int. Cl.
*H02M 1/42* (2007.01)
*H02M 1/14* (2006.01)

(52) U.S. Cl.
CPC ........... *H02M 1/4208* (2013.01); *H02M 1/14* (2013.01); *Y02B 70/126* (2013.01)

(58) Field of Classification Search
CPC ...... H02M 1/4208; H02M 7/217; H02M 7/02; H02M 1/42
(Continued)

(56) References Cited

U.S. PATENT DOCUMENTS

| 3,370,215 A | 2/1968 | Light, Jr. |
| 3,745,437 A | 7/1973 | Brown |

(Continued)

FOREIGN PATENT DOCUMENTS

| DE | 103 58 299 A1 | 7/2005 |
| EP | 0 513 920 A2 | 11/1992 |

(Continued)

OTHER PUBLICATIONS

U.S. Appl. No. 14/708,903, filed May 11, 2015, Giuliano et al.
(Continued)

*Primary Examiner* — Kyle J Moody
(74) *Attorney, Agent, or Firm* — Daly, Crowley, Mofford & Durkee, LLP; Christopher S. Daly

(57) ABSTRACT

A circuit includes a reconfigurable rectifier, a voltage balancer, and a pair of converters. The reconfigurable rectifier includes an ac input port and three output ports. In a first configuration, the reconfigurable rectifier can deliver power at a first output port and, in a second configuration, to at least a second output port. The voltage balancer includes first and second ports coupled to second and third output ports of the reconfigurable rectifier and is configured to balance received voltage at the first and second ports. The first converter has an input coupled to the first port of the voltage balancer and an output at which a first converted voltage signal is provided. The second converter has an input coupled to the second port of the voltage balancer and an output at which a second converted voltage signal is provided.

20 Claims, 14 Drawing Sheets

(58) Field of Classification Search
USPC .................. 363/16, 37, 44, 123–127, 143
See application file for complete search history.

(56) References Cited

U.S. PATENT DOCUMENTS

| | | | |
|---|---|---|---|
| 3,818,360 A | 6/1974 | Boutmy et al. | |
| 4,214,174 A | 7/1980 | Dickson | |
| 4,513,364 A | 4/1985 | Nilssen | |
| 4,812,961 A | 3/1989 | Essaff et al. | |
| 4,903,181 A | 2/1990 | Seidel | |
| 5,057,986 A | 10/1991 | Henze et al. | |
| 5,119,283 A * | 6/1992 | Steigerwald | H02M 1/10 323/207 |
| 5,132,606 A | 7/1992 | Herbert | |
| 5,159,539 A | 10/1992 | Koyama | |
| 5,198,970 A | 3/1993 | Kawabata et al. | |
| 5,268,832 A | 12/1993 | Kandatsu | |
| 5,301,097 A | 4/1994 | McDaniel | |
| 5,331,303 A | 7/1994 | Shiota | |
| 5,402,329 A | 3/1995 | Wittenbreder | |
| 5,557,193 A | 9/1996 | Kajimoto | |
| 5,661,348 A * | 8/1997 | Brown | H02M 1/4208 307/43 |
| 5,717,581 A | 2/1998 | Canclini | |
| 5,737,201 A | 4/1998 | Meynard et al. | |
| 5,761,058 A | 6/1998 | Kanda et al. | |
| 5,793,626 A * | 8/1998 | Jiang | H02M 7/217 323/222 |
| 5,801,987 A | 9/1998 | Dinh | |
| 5,812,017 A | 9/1998 | Golla et al. | |
| 5,831,846 A * | 11/1998 | Jiang | H02M 1/4208 363/125 |
| 5,892,395 A | 4/1999 | Stengel et al. | |
| 5,907,484 A | 5/1999 | Kowshik et al. | |
| 5,956,243 A * | 9/1999 | Mao | H02M 1/4208 363/143 |
| 5,959,565 A | 9/1999 | Taniuchi et al. | |
| 5,978,283 A | 11/1999 | Hsu et al. | |
| 5,982,645 A | 11/1999 | Levran et al. | |
| 6,107,864 A | 8/2000 | Fukushima et al. | |
| 6,133,788 A | 10/2000 | Dent | |
| 6,140,807 A | 10/2000 | Vannatta et al. | |
| 6,154,380 A * | 11/2000 | Assow | H02M 1/10 363/61 |
| 6,157,253 A | 12/2000 | Sigmon et al. | |
| 6,178,102 B1 * | 1/2001 | Stanley | H02M 7/19 323/901 |
| 6,198,645 B1 | 3/2001 | Kotowski et al. | |
| 6,255,906 B1 | 7/2001 | Eidson et al. | |
| 6,275,018 B1 | 8/2001 | Telefus et al. | |
| 6,327,462 B1 | 12/2001 | Loke et al. | |
| 6,339,538 B1 | 1/2002 | Handleman | |
| 6,377,117 B2 | 4/2002 | Oskowsky et al. | |
| 6,396,341 B1 | 5/2002 | Pehlke | |
| 6,476,666 B1 | 11/2002 | Palusa et al. | |
| 6,486,728 B2 | 11/2002 | Kleveland | |
| 6,501,325 B1 | 12/2002 | Meng | |
| 6,504,422 B1 | 1/2003 | Rader et al. | |
| 6,507,503 B2 | 1/2003 | Norrga | |
| 6,515,612 B1 | 2/2003 | Abel | |
| 6,563,235 B1 | 5/2003 | McIntyre et al. | |
| 6,650,552 B2 | 11/2003 | Takagi et al. | |
| 6,700,803 B2 | 3/2004 | Krein | |
| 6,738,277 B2 * | 5/2004 | Odell | H02J 7/0016 363/143 |
| 6,738,432 B2 | 5/2004 | Pehlke et al. | |
| 6,759,766 B2 | 7/2004 | Hiratsuka et al. | |
| 6,927,441 B2 | 8/2005 | Pappalardo et al. | |
| 6,934,167 B2 | 8/2005 | Jang et al. | |
| 6,980,181 B2 | 12/2005 | Sudo | |
| 7,072,195 B2 | 7/2006 | Xu | |
| 7,091,778 B2 | 8/2006 | Gan et al. | |
| 7,103,114 B1 | 9/2006 | Lapierre | |
| 7,135,847 B2 | 11/2006 | Taurand | |
| 7,145,382 B2 | 12/2006 | Ker et al. | |
| 7,157,956 B2 | 1/2007 | Wei | |
| 7,161,816 B2 | 1/2007 | Shteynberg et al. | |
| 7,190,210 B2 | 3/2007 | Azrai et al. | |
| 7,224,062 B2 | 5/2007 | Hsu | |
| 7,236,542 B2 | 6/2007 | Matero | |
| 7,239,194 B2 | 7/2007 | Azrai et al. | |
| 7,250,810 B1 | 7/2007 | Tsen et al. | |
| 7,269,036 B2 | 9/2007 | Deng et al. | |
| 7,330,070 B2 | 2/2008 | Vaisanen | |
| 7,362,251 B2 | 4/2008 | Jensen et al. | |
| 7,375,992 B2 | 5/2008 | Mok et al. | |
| 7,382,113 B2 | 6/2008 | Wai et al. | |
| 7,382,634 B2 | 6/2008 | Buchmann | |
| 7,408,330 B2 | 8/2008 | Zhao | |
| 7,443,705 B2 * | 10/2008 | Ito | H02M 1/4241 363/125 |
| 7,511,978 B2 | 3/2009 | Chen et al. | |
| 7,521,914 B2 | 4/2009 | Dickerson et al. | |
| 7,535,133 B2 | 5/2009 | Perreault et al. | |
| 7,589,605 B2 | 9/2009 | Perreault et al. | |
| 7,595,682 B2 | 9/2009 | Lin et al. | |
| 7,616,467 B2 | 11/2009 | Mallwitz | |
| 7,633,778 B2 | 12/2009 | Mok et al. | |
| 7,696,735 B2 | 4/2010 | Draw et al. | |
| 7,705,681 B2 | 4/2010 | Ilkov | |
| 7,724,551 B2 | 5/2010 | Yanagida et al. | |
| 7,768,800 B2 | 8/2010 | Mazumduer et al. | |
| 7,777,459 B2 | 8/2010 | Williams | |
| 7,782,027 B2 | 8/2010 | Williams | |
| 7,786,712 B2 | 8/2010 | Williams | |
| 7,807,499 B2 | 10/2010 | Nishizawa | |
| 7,812,579 B2 | 10/2010 | Williams | |
| 7,889,519 B2 | 2/2011 | Perreault et al. | |
| 7,907,429 B2 | 3/2011 | Ramadass et al. | |
| 7,907,430 B2 | 3/2011 | Kularatna et al. | |
| 7,928,705 B2 | 4/2011 | Hooijschuur et al. | |
| 7,940,038 B2 | 5/2011 | Da Silva et al. | |
| 7,956,572 B2 | 6/2011 | Zane et al. | |
| 7,977,921 B2 | 7/2011 | Bahai et al. | |
| 7,999,601 B2 | 8/2011 | Schlueter et al. | |
| 8,000,117 B2 | 8/2011 | Petricek | |
| 8,018,216 B2 | 9/2011 | Kakehi | |
| 8,026,763 B2 | 9/2011 | Dawson et al. | |
| 8,040,174 B2 | 10/2011 | Likhterov | |
| 8,048,766 B2 | 11/2011 | Joly et al. | |
| 8,085,524 B2 | 12/2011 | Roozeboom et al. | |
| 8,111,054 B2 | 2/2012 | Yen et al. | |
| 8,130,518 B2 | 3/2012 | Fishman | |
| 8,159,091 B2 | 4/2012 | Yeates | |
| 8,164,384 B2 | 4/2012 | Dawson et al. | |
| 8,169,797 B2 * | 5/2012 | Coccia | H02M 1/10 363/142 |
| 8,193,604 B2 | 6/2012 | Lin et al. | |
| 8,212,541 B2 | 7/2012 | Perreault et al. | |
| 8,276,002 B2 | 9/2012 | Dennard et al. | |
| 8,339,184 B2 | 12/2012 | Kok et al. | |
| 8,350,549 B2 | 1/2013 | Kitabatake | |
| 8,384,467 B1 | 2/2013 | O'Keeffe et al. | |
| 8,395,914 B2 | 3/2013 | Klootwijk et al. | |
| 8,451,053 B2 | 5/2013 | Perreault et al. | |
| 8,456,874 B2 | 6/2013 | Singer et al. | |
| 8,503,203 B1 | 8/2013 | Szczeszynski et al. | |
| 8,643,347 B2 | 2/2014 | Giuliano et al. | |
| 8,659,353 B2 | 2/2014 | Dawson et al. | |
| 8,670,254 B2 | 3/2014 | Perreault et al. | |
| 8,718,188 B2 | 5/2014 | Balteanu et al. | |
| 8,729,819 B2 | 5/2014 | Zhao et al. | |
| 8,824,978 B2 | 9/2014 | Briffa et al. | |
| 8,829,993 B2 | 9/2014 | Briffa et al. | |
| 8,830,709 B2 | 9/2014 | Perreault | |
| 8,830,710 B2 | 9/2014 | Perreault et al. | |
| 8,860,396 B2 | 10/2014 | Giuliano | |
| 8,957,727 B2 | 2/2015 | Dawson et al. | |
| 9,048,727 B2 | 6/2015 | Giuliano et al. | |
| 9,209,758 B2 | 12/2015 | Briffa et al. | |
| 2003/0169096 A1 | 9/2003 | Hsu et al. | |
| 2003/0227280 A1 | 12/2003 | Vinciarelli | |
| 2004/0041620 A1 | 3/2004 | D'Angelo et al. | |
| 2004/0170030 A1 | 9/2004 | Duerbaum et al. | |

(56) References Cited

U.S. PATENT DOCUMENTS

| | | |
|---|---|---|
| 2004/0222775 A1 | 11/2004 | Muramatsu et al. |
| 2005/0007184 A1 | 1/2005 | Kamijo |
| 2005/0088865 A1 | 4/2005 | Lopez et al. |
| 2005/0207133 A1 | 9/2005 | Pavier et al. |
| 2005/0213267 A1 | 9/2005 | Azrai et al. |
| 2005/0286278 A1 | 12/2005 | Perreault et al. |
| 2007/0035977 A1 | 2/2007 | Odell |
| 2007/0066224 A1 | 3/2007 | d'Hont et al. |
| 2007/0066250 A1 | 3/2007 | Takahashi et al. |
| 2007/0069818 A1 | 3/2007 | Bhatti et al. |
| 2007/0091655 A1 | 4/2007 | Oyama et al. |
| 2007/0123184 A1 | 5/2007 | Nesimoglu et al. |
| 2007/0146020 A1 | 6/2007 | Williams |
| 2007/0146090 A1 | 6/2007 | Carey et al. |
| 2007/0159257 A1 | 7/2007 | Lee et al. |
| 2007/0171680 A1 | 7/2007 | Perreault et al. |
| 2007/0210774 A1 | 9/2007 | Kimura et al. |
| 2007/0230221 A1 | 10/2007 | Lim et al. |
| 2007/0247222 A1 | 10/2007 | Sorrells et al. |
| 2007/0247253 A1 | 10/2007 | Carey et al. |
| 2007/0281635 A1 | 12/2007 | McCallister et al. |
| 2007/0290747 A1 | 12/2007 | Traylor et al. |
| 2007/0291718 A1 | 12/2007 | Chan et al. |
| 2007/0296383 A1 | 12/2007 | Xu et al. |
| 2008/0001660 A1 | 1/2008 | Rasmussen |
| 2008/0003960 A1 | 1/2008 | Zolfaghari |
| 2008/0003962 A1 | 1/2008 | Ngai |
| 2008/0007333 A1 | 1/2008 | Lee et al. |
| 2008/0012637 A1 | 1/2008 | Aridas et al. |
| 2008/0013236 A1 | 1/2008 | Weng |
| 2008/0019459 A1 | 1/2008 | Chen et al. |
| 2008/0031023 A1 | 2/2008 | Kitagawa et al. |
| 2008/0062724 A1 | 3/2008 | Feng et al. |
| 2008/0150621 A1 | 6/2008 | Lesso et al. |
| 2008/0157732 A1 | 7/2008 | Williams |
| 2008/0157733 A1 | 7/2008 | Williams |
| 2008/0158915 A1 | 7/2008 | Williams |
| 2008/0239772 A1 | 10/2008 | Oraw et al. |
| 2009/0059630 A1 | 3/2009 | Williams |
| 2009/0072800 A1 | 3/2009 | Ramadass et al. |
| 2009/0102439 A1 | 4/2009 | Williams |
| 2009/0147554 A1 | 6/2009 | Adest et al. |
| 2009/0196082 A1 | 8/2009 | Mazumder et al. |
| 2009/0257211 A1 | 10/2009 | Kontani et al. |
| 2009/0273955 A1 | 11/2009 | Tseng et al. |
| 2009/0278520 A1 | 11/2009 | Perreault et al. |
| 2009/0302686 A1 | 12/2009 | Fishman |
| 2009/0303753 A1 | 12/2009 | Fu et al. |
| 2009/0323380 A1 | 12/2009 | Harrison |
| 2010/0073084 A1 | 3/2010 | Hur et al. |
| 2010/0085786 A1 | 4/2010 | Chiu et al. |
| 2010/0110741 A1 | 5/2010 | Lin et al. |
| 2010/0117612 A1 | 5/2010 | Klootwijk et al. |
| 2010/0140736 A1 | 6/2010 | Lin et al. |
| 2010/0142239 A1 | 6/2010 | Hopper |
| 2010/0201441 A1 | 8/2010 | Gustavsson |
| 2010/0202161 A1 | 8/2010 | Sims et al. |
| 2010/0214746 A1 | 8/2010 | Lotfi et al. |
| 2010/0244189 A1 | 9/2010 | Klootwijk et al. |
| 2010/0244585 A1 | 9/2010 | Tan et al. |
| 2010/0308751 A1 | 12/2010 | Nerone |
| 2011/0001542 A1 | 1/2011 | Ranta et al. |
| 2011/0148518 A1 | 6/2011 | Lejon et al. |
| 2011/0163414 A1 | 7/2011 | Lin et al. |
| 2011/0181128 A1 | 7/2011 | Perreault et al. |
| 2012/0043818 A1 | 2/2012 | Stratakos et al. |
| 2012/0146177 A1 | 6/2012 | Choi et al. |
| 2012/0153907 A1 | 6/2012 | Carobolante et al. |
| 2012/0176195 A1 | 7/2012 | Dawson et al. |
| 2012/0313602 A1 | 12/2012 | Perreault et al. |
| 2012/0326684 A1 | 12/2012 | Perreault et al. |
| 2013/0049714 A1 | 2/2013 | Chiu |
| 2013/0094157 A1 | 4/2013 | Giuliano et al. |
| 2013/0154600 A1 | 6/2013 | Giuliano et al. |
| 2013/0241625 A1 | 9/2013 | Perreault et al. |
| 2013/0343106 A1 | 12/2013 | Perreault et al. |
| 2013/0343107 A1 | 12/2013 | Perreault |
| 2014/0118065 A1 | 5/2014 | Briffa et al. |
| 2014/0118072 A1 | 5/2014 | Briffa et al. |
| 2014/0120854 A1 | 5/2014 | Briffa et al. |
| 2014/0167513 A1 | 6/2014 | Chang et al. |
| 2014/0225581 A1 | 8/2014 | Giuliano et al. |
| 2014/0226378 A1 | 8/2014 | Perreault |
| 2014/0306648 A1 | 10/2014 | Le et al. |
| 2014/0306673 A1 | 10/2014 | Le et al. |
| 2014/0313781 A1 | 10/2014 | Perreault et al. |
| 2014/0335805 A1 | 11/2014 | Briffa et al. |
| 2014/0339918 A1 | 11/2014 | Perreault et al. |
| 2014/0355322 A1 | 12/2014 | Perreault et al. |
| 2015/0022173 A1 | 1/2015 | Le et al. |
| 2015/0023063 A1* | 1/2015 | Perreault ............... H02M 3/337 363/17 |
| 2015/0084701 A1 | 3/2015 | Perreault et al. |
| 2015/0097538 A1 | 4/2015 | Le et al. |
| 2015/0295497 A1 | 10/2015 | Perreault et al. |
| 2015/0357912 A1* | 12/2015 | Perreault ............. H02M 1/4208 363/126 |
| 2016/0254754 A1 | 9/2016 | Perreault et al. |

FOREIGN PATENT DOCUMENTS

| | | | |
|---|---|---|---|
| EP | 1 750 366 A2 | 2/2007 | |
| EP | 1 750 366 A3 | 2/2007 | |
| JP | H10327573 A | 12/1998 | |
| JP | H11235053 A | 8/1999 | |
| JP | 2002-62858 | 2/2002 | |
| JP | 2010/045943 A | 2/2010 | |
| WO | WO 2006/093600 A2 | 9/2006 | |
| WO | WO 2007/136919 A2 | 11/2007 | |
| WO | WO 2007/136919 A3 | 11/2007 | |
| WO | WO 2009/112900 A1 | 9/2009 | |
| WO | WO 2012151466 A2 | 11/2012 | |
| WO | WO 2013/059446 A1 | 4/2013 | |
| WO | WO 2013/086445 A1 | 6/2013 | |
| WO | WO 2013/096416 A1 | 6/2013 | |
| WO | WO2013086445 A1 | 6/2013 | |
| WO | WO 2014/168911 A1 | 10/2014 | |

OTHER PUBLICATIONS

U.S. Appl. No. 14/758,033, filed Jun. 26, 2015, Perreault et al.
Alspach; "Solar Power Inverter Manufacturers Get Day in Sun;" Boston Business Journal; Oct. 29, 2010; 1 page.
Denning; "Solar Market Is Risking Sunstroke;" Wall Street Journal; Dec. 11-12, 2010, 1 page.
Pierquet, et al.; "A Single-Phase Photovoltaic Inverter Topology with a Series-Connected Power Buffer;" (ECCE), IEEE, Sep. 2010, pp. 1-9.
Trubitsyn, et al.; High-Efficiency Inverter for Photovoltaic Applications; (ECCE), IEEE, Sep. 2010, pp. 1-9.
Bush, et al.; "A Single-Phase Current Source Solar Inverter with Reduced-Size DC Link;" Energy Conversion Congress and Exposition; IEEE; Sep. 20, 2009; 6 Pages.
Krein, et al.; "Cost-Effective Hundred-Year Life for Single-Phase Inverters and Rectifiers in Solar and LED Lighting Applications Based on Minimum Capacitance Requirements and a Ripple Power Port;" Applied Power Electronics Conference and Exposition; IEEE; Feb. 15, 2009; 6 Pages.
Li; "A Review of the Single Phase Photovoltaic Module Integrated Converter Topologies With Three Different DC Link Configurations;" IEEE Transactions on Power Electronics; vol. 23; No. 3; May 2008; 14 Pages.
Invitation to Pay Additional Fees dated Jul. 5, 2011 for International Application No. PCT/US2011/022056; 3 Pages.
Partial Search Report of the ISA dated Jul. 5, 2011 for International Application No. PCT/US2011/022056; 6 Pages.
PCT Search Report and Written Opinion dated Sep. 23, 2011 for International Application No. PCT/US2011/022056; 15 Pages.
PCT International Preliminary Report on Patentability dated Aug. 2, 2012 for International Application No. PCT/US2011/022056; 9 Pages.

(56) References Cited

OTHER PUBLICATIONS

Ozpineci, et al.; "Cycloconverters;" An on-line tutorial for the IEEE Power Electronics Society; http://pels.org/Comm/Education/Tutorials/tutorials.htm; 2001; 17 Pages.
Perreault et al.; "Multi-Phase Grid Interface;" for U.S. Appl. No. 13/795,633, filed Mar. 12, 2013; 41 Pages.
PCT International Search Report and Written Opinion dated May 13, 2013 for International Application No. PCT/US2013/030383; 13 Pages.
PCT International Preliminary Report and Written Opinion dated May 26, 2011 for International Application No. PCT/US2009/063821; 9 Pages.
Amendment to Office Action dated Apr. 7, 2011 for U.S. Appl. No. 12/680,048; 7 Pages.
PCT Search Report and Written Opinion dated Apr. 13, 2010 for International Application No. PCT/US2009/063821; 16 Pages.
PCT Invitation to Pay Additional Fees dated Feb. 9, 2010 for International Application No. PCT/US2009/063821; 44 Pages.
Xuejun Zhang, et al., "Analysis of Power Recycling Techniques for RF and Microwave Outphasing Power Amplifiers", IEEE Transactions on Circuits and Systems-II: Analog and Digital Signal Porcessing, vol. 49, No. 5, May 2002, 9 Pages.
Sungwon Chung, et al., "Asymmetric Multilevel Outphasing Architecture for Multi-Standard Transmitters", 2009 IEEE Radio Frequency Integrated Circuits Symposium, 4 Pages.
D. Diaz, et al., "Comparison of Two Different Cell Topologies for a Multilevel Power Supply to Achieve High Efficiency Envelope Amplifier", IEEE , 2009, 6 Pages.
M. Rodriguez, et al., "Multilevel Converter for Envelope Tracking in RF Power Amplifiers", IEEE, 2009, 8 Pages.
Yuan-Jyue Chen, et al., "Multilevel LINC System Design for Wireless Transmitters", IEEE, 2007, 4 Pages.
Jinsung Choi, et al., "A Δ Σ—Digitized Polar RF Transmitter", IEEE Transactions on Microwave Theory and Techniques, vol. 55, No. 12, Dec. 2007, 12 Pages.
Kai-Yuan Jheng, et al., "Multilevel LINC System Design for Power Efficiency Enhancement", IEEE, 2007, 4 Pages.
Kevin Tom, et al., "Load-Pull Analysis of Outphasing Class-E Power Amplifier", The $2^{nd}$ International Conference on Wireless Broadband and Ultra Wideband Communications (AusWireless 2007), IEEE, 2007, 4 Pages.
Yehui Han, et al., "Resistance Compression Networks for Radio-Frequency Power Conversion", IEEE Transactions on Power Electronics, vol. 22, No. 1, Jan. 2007, 13 Pages.
Surya Musunuri, et al., "Improvement of Light-Load Efficiency Using Width-Switching Scheme for CMOS Transistors", IEEE Power Electronics Letters, vol. 3, No. 3, Sep. 2005, 6 Pages.
Frederick H. Raab, et al., "RF and Microwave Power Amplifier and Transmitter Technologies—Part 3", Sep. 2003, High Frequency Electronics, Summit Technical Media, LLC., 9 Pages.
Petri Eloranta, et al., "A Multimode Transmitter in 0.13 μ m CMOS Using Direct-Digital RF Modulator", IEEE Journal of Solid-State Circuits, vol. 42, No. 12, Dec. 2007, 11 Pages.
Hur, et al., "Highly Efficient and Linear Level Shifting Digital LINC Transmitter with a Phase Offset Cancellation;" IEEE; Jul. 2009; 4 Pages.
Hur, et al., "A Multi-Level and Multi-Band Class-D CMOS Power Amplifier for the LINC System in the Cognitive Radio Application;" IEEE; Feb. 2010, 3 Pages.
Hur, et al., "Highly Efficient Uneven Multi-Level LINC Transmitter;" Electronics Letter; vol. 45; No. 16; Jul. 30, 2009; 2 Pages.
U.S. Appl. No. 12/615,696; 427 Pages.
U.S. Appl. No. 13/106,195; Part 1 of 2; 295 Pages.
U.S. Appl. No. 13/106,195; Part 2 of 2; 234 Pages.
U.S. Appl. No. 13/423,909; Part 1 of 4; 353 Pages.
U.S. Appl. No. 13/423,909; Part 2 of 4; 370 Pages.
U.S. Appl. No. 13/423,909; Part 3 of 4; 368 Pages.
U.S. Appl. No. 13/423,909; Part 4 of 4; 73 Pages.
U.S. Appl. No. 13/798,738; Part 1 of 7; 200 Pages.
U.S. Appl. No. 13/798,738; Part 2 of 7; 200 Pages.
U.S. Appl. No. 13/798,738; Part 3 of 7; 200 Pages.
U.S. Appl. No. 13/798,738; Part 4 of 7; 200 Pages.
U.S. Appl. No. 13/798,738; Part 5 of 7; 200 Pages.
U.S. Appl. No. 13/798,738; Part 7 of 7; 200 Pages.
U.S. Appl. No. 13/798,738; Part 7 of 7; 101 Pages.
Abutbul, et al.; "Step-Up Switching-Mode Converter with High Voltage Gain Using a Switched-Capacitor Circuit;" IEEE Transactions on Circuits and Systems—1: Fundamental Theory and Applications; vol. 50, No. 8; Aug. 2003; pp. 1098-1102.
Axelrod, et al.; "Single-Switch Single-Stage Switched-Capacitor Buck Converter;" $4^{th}$ Nordic Workshop on Power and Industrial Electronics; Jun. 2004; 5 pages.
Giuliano, et al.; "Architectures and Topologies for Power Delivery;" Biannual Review of MIT Center for Integrated Circuits; Power Point Presentation; May 9, 2007; 17 slides.
Ma, et al.; "Design and Optimization on Dynamic Power Systems for Self-Powered Integrated Wireless Sensing Nodes;" Low Power Electronics and Design, 2005; ISLPED 05; Proceedings of the 2005 International Symposium; Aug. 8-10, 2005; pp. 303-306.
MAXIM; Triple-Output TFT-LCD DC-DC Converters; MAX1748/MAX8726; 19/3430; Rev 0; Oct. 2004; pp. 1-16.
Ottman, et al.; "Optimized Piezoelectric Energy Harvesting Circuit Using Step-Down Converter in Discontinuous Conduction Mode;" Power Electronics Specialists Conference, 2002; pesc 02. 2002; IEEE $33^{rd}$ Annual; vol. 4; Jun. 23-27, 2002; pp. 1988-1994.
Sun, et al.; "High Power Density, High Efficiency System Two-Stage Power Architecture for Laptop Computers;" $37^{th}$ IEEE Power Electronics Specialists Conference apros; 06; Jun. 18, 2006; 7 pages.
Wood, et al.; "Design, Fabrication and Initial Results of a 2g Autonomous Glider;" Industrial Electronics Society, IECON 2005; $31^{st}$ Annual Conference of IEEE: Nov. 6-10, 2005; pp. 1870-1877.
Xu, et al.; Voltage Divider and its Application in the Two-stage Power Architecture; Applied Power Electronics Conference and Exposition 2006; APEC 06; Twenty-First Annual IEEE: Mar. 19-23, 2006; pp. 499-505.
U.S. Appl. No. 12/437,599; 210 Pages.
U.S. Appl. No. 13/487,781; Part 1 of 2; 251 Pages.
U.S. Appl. No. 13/487,781; Part 2 of 2; 230 Pages.
U.S. Appl. No. 13/599,037; Part 1 of 2; 200 Pages.
U.S. Appl. No. 13/599,037; Part 2 of 2; 269 Pages.
U.S. Appl. No. 14/251,917; Part 1 of 10; 225 Pages.
U.S. Appl. No. 14/251,917; Part 2 of 10; 225 Pages.
U.S. Appl. No. 14/251,917; Part 3 of 10; 225 Pages.
U.S. Appl. No. 14/251,917; Part 4 of 10; 225 Pages.
U.S. Appl. No. 14/251,917; Part 5 of 10; 225 Pages.
U.S. Appl. No. 14/251,917; Part 6 of 10; 225 Pages.
U.S. Appl. No. 14/251,917; Part 7 of 10; 225 Pages.
U.S. Appl. No. 14/251,917; Part 8 of 10; 225 Pages.
U.S. Appl. No. 14/251,917; Part 9 of 10; 225 Pages.
U.S. Appl. No. 14/251,917; Part 10 of 10; 146 Pages.
U.S. Appl. No. 13/011,317; 372 Pages.
Araghchini, et al.; "A Technology Overview of the PowerChip Development Program;" IEEE Transactions on Power Electronics; vol. 28; No. 9; Sep. 2013; 20 Pages.
Chen, et al.; "Stacked Switched Capacitor Energy Buffer Architecture;" IEEE Transactions on Power Electronics; Vo. 28; No. 11; Nov. 2013; 13 Pages.
Huber, et al.; "Design-Oriented Analysis and Performance Evaluation of Buck PFC Front End;" IEEE Transactions on Power Electronics; vol. 25; No. 1; Jan. 2010; 10 Pages.
Kjaer, et al.; "Design Optimization of a Single Phase Inverter for Photovoltaic Applications;" Power Electronics Specialist Conference; 2003; PESC 03; IEEE $34^{th}$ Annual; vol. 3; Jun. 15-19, 2003; 8 Pages.
Krein, et al.; "Cost-Effective Hundred-Year Life for Single Phase Inverters and Rectifiers in Solar and LED Lighting Applications Based on Minimum Capacitance Requirements and a Ripple Power Port;" Applied Power Electronics Conference and Exposition; APEC 2009; Twenty-Fourth Annual IEEE; Feb. 15-19, 2009; 6 Pages.

(56) References Cited

OTHER PUBLICATIONS

Kyritsis, et al.; "A Novel Parallel Active Filter for Current Pulsation Smoothing on Single Stage Grid- Connected AC-PV Modules;" Power Electronics and Applications; 2007 European Conference on; Sep. 2-5, 2007; 10 Pages.

Kyritsis, et al.; "Enhanced Current Pulsation Smoothing Parallel Active Filter for Single Stage Grid-Connected AC-PV Modules;" International Power Electronics and Motion Control Conference 2008; EPE-PEMC; 2008; 13th; 6 Pages.

Garcia, et al.; "Single Phase Power Factor Correction: A Survey;" IEEE Transactions on Power Electronics; vol. 18; No. 3; May 2003; 7 Pages.

Lam, et al.; "A Novel High-Power-Factor Single-Switch Electronic Ballast;" IEEE Transactions on Industry Applications; vol. 46; No. 6; Nov./Dec. 2010; 10 Pages.

Lim, et al.; "Power Conversion Architecture for Grid Interface at High Switching Frequency;" Applied Power Electronics Conference and Exposition (APEC); 2014 Twenty-Ninth Annual IEEE: 2014; 8 Pages.

Lim, et al.; "Two-Stage Power Conversion Architecture for an LED Driver Circuit;" Applied Power Electronics Conference and Exposition (APEC); 2013; Twenty-Eighth Annual IEEE; Mar. 17-21, 2013; 8 Pages.

Perreault, et al.; "Opportunities and Challenges in Very High Frequency Power Conversion;" Applied Power Electronics Conference and Exposition; 2009; APEC 2009; Twenty-Fourth Annual IEEE: Feb. 15-19, 2009; 14 Pages.

Pierquet, et al.; "A Single-Phase Photovoltaic Inverter Topology With a Series-Connected Energy Buffer;" IEEE Transactions on Power Electronics; vol. 28; No. 10; Oct. 2013; 9 Pages.

Pilawa-Podgurski, et al.; "Merged Two-Stage Power Converter With Soft Charging Switched-Capacitor Stage in 180 nm CMOS;" IEEE Journal of Solid-State Circuits; vol. 47; No. 7; Jul. 2012; 11 Pages.

Schlecht, et al.; "Active Power Factor Correction for Switching Power Supplies;" IEEE Transactions on Power Electronics; vol. PE-2; No. 4; Oct. 1987; 9 Pages.

Seeman, et al.; "Analysis and Optimization of Switched-Capacitor DC-DC Converters;" IEEE Transactions on Power Electronics; vol. 23; No. 2; Mar. 2008; 11 Pages.

Shimizu, et al.; "Flyback-Type Single-Phase Utility Interactive Inverter With Power Pulsation Decoupling on the DC Input for an AC Photovoltaic Module System;" IEEE Transactions on Power Electronics; vol. 21; No. 5; Sep. 2006; 9 Pages.

Singh, et al,; "A Review of Single-Phase Improved Power Quality AX-DC Converters;" IEEE Transactions on Industrial Electronics; vol. 50; No. 5; Oct. 2003; 20 Pages.

Keogh; Power Factor Correction Using the Buck Topology—Efficient Benefits and Practical Design Considerations; Texas Instruments; Reproduced from Texas Instruments Power Supply Design Seminar; SEM1900; Topic 4; TI Literature No. SLUP264; 2010; 36 Pages.

Tse, et al.; "A Family of PFC Voltage Regulator Configurations with Reduced Redundant Power Processing;" IEEE Transactions on Power Electronics; vol. 16; No. 6; Nov. 2001; 9 Pages.

Vorperian; "Quasi-Square-Wave Converters: Topologies and Analysis;" IEEE Transactions on Power Electronics; vol. 3; No. 2; Apr. 1, 1988; 9 Pages.

Wu, et al.; Design Considerations of Soft-Switched Buck PFC Converter with Constant On-Time (COT) Control; IEEE Transactions on Power Electronics; vol. 26; No. 11; Nov. 2011; 9 Pages.

PCT International Search Report and Written Opinion dated Aug. 28, 2014 for International Application No. PCT/US2014/033267; 10 Pages.

U.S. Appl. No. 14/758,033; Part 1 of 3; 100 Pages.
U.S. Appl. No. 14/758,033; Part 2 of 3; 100 Pages.
U.S. Appl. No. 14/758,033; Part 3 of 3; 187 Pages.
U.S. Appl. No. 14/837,616, filed Aug. 27, 2015, Briffa, et al.
U.S. Appl. No. 14/823,220, filed Aug. 11, 2005, Barton, et al.
PCT International Search Report and Written Opinion dated Sep. 21, 2015 corresponding to International Application No. PCT/US2015/039197; 8 Pages.
U.S. Appl. No. 14/934,760, filed Nov. 6, 2015, Briffa, et al.
U.S. Appl. No. 14/920,031, filed Oct. 22, 2015, Briffa, et al.
U.S. Appl. No. 14/968,045, filed Dec. 14, 2015, Perreault et al.
U.S. Appl. No. 14/974,563, filed Dec. 18, 2015, Perreault et al.
U.S. Appl. No. 14/975,742, filed Dec. 19, 2015, Perreault et al.
Non-Final Office Action dated Oct. 3, 2016; for U.S. Appl. No. 14/758,033; 28 pages.
U.S. Appl. No. 15/290,402, filed Oct. 11, 2016, Perreault, et al.
U.S. Appl. No. 15/287,068, filed Oct. 6, 2016, Briffa, et al.
U.S. Appl. No. 15/354,170, filed Nov. 17, 2016, Briffa, et al.
U.S. Appl. No. 14/035,445, filed Sep. 24, 2013, Perreault.
U.S. Appl. No. 14/401,981, filed Nov. 18, 2014, Perreault.
U.S. Appl. No. 14/416,654, filed Jan. 23, 2015, Perreault, et al.
U.S. Appl. No. 14/619,737, filed Feb. 11, 2015, Perreault, eta al.
U.S. Appl. No. 14/435,914, filed Apr. 15, 2015, Perreault, et al.
U.S. Appl. No. 14/758,033, filed Jun. 26, 2015, Perreault, et al.
Zhang et al., "Single-Stage Input-Current-Shaping Technique with Voltage-Doubler-Rectifier Front End;" Proceedings IEEE Transactions on Power Electronics, vol. 16, No. 1; Jan. 2001; 9 Pages.
U.S. Appl. No. 15/149,491, filed May 9, 2016, Perreault, et al.
U.S. Appl. No. 15/585,676, filed May 3, 2017, Giuliano, et al.
Response to Office Action dated Jul. 1, 2016 for U.S. Appl. No. 14/708,903; Response filed on Jan. 3, 2017; 10 pages.
PCT International Preliminary Report on Patentability for PCT/US2014/033267 dated Oct. 22, 2015; 9 Pages.
PCT International Preliminary Report on Patentability for PCT/US2015/039197 dated Jan. 12, 2017; 7 Pages.
Han, et al.; "A New Approach to Reducing Output Ripple in Switched-Capacitor-Based Step-Down DC-DC Converters;" IEEE Transactions on Power Electronics; vol. 21; No. 6; Nov. 2006; 8 pages.
Lei, et al.; "Analysis of Switched-Capacitor DC-DC Converters in Soft-Charging Operation;" 14th IEEE Workshop on Control and Modeling for Power Electronics; Jun. 23, 2013; 7 pages.
Linear Technology Data Sheet for Part LTC3402; "2A, 3MHz Micopower Synchronous Boost Converter;" 2000; 16 pages.
Makowski, et al; "Performance Limits of Switched-Capacitor DC-DC Converters;" IEEE PESC'95; 26th Annual Power Electronics Specialists Conference; vol. 2; Jul. 1995; 7 pages.
Meynard, et al.; "Multi-Level Conversion: High Voltage Choppers and Voltage-Source Inverters;" 23rd Annual IEEE Power Electronics Specialists Conference; Jan. 1992; 7 pages.
Middlebrook; "Transformerless DC-to-DC Converters with Large Conversion Ratios;" IEEE Transitions on Power Electronics; vol. 3; No. 4; Oct. 1988; 5 pages.
Ng; "Switched Capacitor DC-DC Converter: Superior Where the Buck Converter Has Dominated;" PhD Thesis, UC Berkeley; Aug. 17, 2011; 138 pages.
Pilawa-Podgurski, et al.; "Merged Two-Staged Power Converter Architecture with Soft Charging Switched-Capacitor Energy Transfer;" 2008 IEEE Power Electronics Specialists Conference; Jun. 15-19, 2008; 8 pages.
Texas Instruments Data Sheet for Part TPS54310; "3-V to 6-V Input, 3-V Output Synchronous-Buck PWM Switcher with Integrated FETs (SWIFT);" dated Jan. 2005; 19 pages.
Umeno, et al.; "A New Approach to Low Ripple-Noise Switching Converters on the Basis of Switched-Capacitor Converters;" IEEE International Symposium on Circuits and Systems; Jun. 11-14, 1991; 4 pages.
Notice of Allowance dated Feb. 23, 2017 for U.S. Appl. No. 14/708,903; 20 pages.
Notice of Allowance dated Mar. 6, 2017 for U.S. Appl. No. 14/758,033; 12 pages.
Office Action dated Oct. 6, 2017 for U.S. Appl. No. 15/585,676, 27 pages.

* cited by examiner

HIGH-FREQUENCY, HIGH DENSITY POWER FACTOR CORRECTION CONVERSION FOR UNIVERSAL INPUT GRID INTERFACE

CROSS REFERENCE TO RELATED APPLICATION

This application claims the benefit under 35 U.S.C. § 119(e) of U.S. Provisional Application No. 62/020,472 filed Jul. 3, 2014, which application is incorporated herein by reference in its entirety.

BACKGROUND

As is known in the art, power converters for supplying dc loads from a single-phase ac grid are used to power many electronic systems. Typical designs must operate on ac input voltage having a relatively wide range (e.g., 85-264 Vrms), and provide a (preferably regulated) dc output. Some applications require an isolated low-voltage dc output (e.g., 24 V). The efficiency of a power converter is also important for many applications (e.g., >95% for a non-isolated output or 90-95% for isolated conversion to low voltage), as is ac line power factor (e.g., >0.9 or >0.95).

Conventional power converters typically operate at relatively low switching frequencies (typically on the order of 200 kHz or below) with associated low power densities (~10 W/in$^3$ or below). Moreover, at such switching frequencies, the magnetic energy storage components and filters needed for power converters may be relatively large and expensive. Thus, the size and cost of conventional power converters is often dominated by the requirements of the necessary magnetic components.

SUMMARY

In accordance with the concepts described herein, it has been recognized that there is a need for new power electronics technologies that can meet the requirements of practical applications at far lower size and cost than is presently achievable. To achieve these goals, new circuit designs are disclosed herein. Such designs can operate at high frequencies and thus utilize passive energy storage components which are relatively small compared with the size of storage components used in conventional systems. This disclosure describes high-frequency power converter designs that may be well-suited to systems operating at relatively high power levels (e.g., >100 W) from ac universal input voltage. Circuits disclosed herein can provide one or more of the following advantages: low-voltage isolated outputs, high efficiency, and/or power factor while at the same time providing large reductions in the physical size of circuits.

According to one aspect of the disclosure, a circuit comprises a reconfigurable rectifier having an input port configured to receive an alternating current (ac) input signal and first, second, and third output ports, wherein in a first configuration the reconfigurable rectifier is configured to deliver power at the first output port and in a second configuration the reconfigurable rectifier is configured to deliver power to at least the second output port; a voltage balancer having first and second ports, with the first and second ports coupled to the second and third output ports of the reconfigurable rectifier and configured to balance the voltage at the first and second ports; a first converter having an input coupled to the first port of the voltage balancer and having an output at which a first converted voltage signal is provided; and a second converter having an input coupled to the second port of the voltage balancer and having an output at which a second converted voltage signal is provided.

In some embodiments of the circuit, in the second configuration, the reconfigurable rectifier is configured to deliver power to the second output port, wherein the voltage balancer is configured to transfer power received from the second output port of the reconfigurable rectifier such that first and second converters may process substantially equal power levels. In other embodiments, in the second configuration, the reconfigurable rectifier is configured to deliver power to the second and third output ports in alternating half ac cycles, wherein the voltage balancer is configured to transfer power received from the second and third output ports of the reconfigurable rectifier such that first and second converters may process substantially equal power levels.

In various embodiments, the circuit further comprises at least one configuration switch having a first state to place the reconfigurable rectifier in the first and a second state to place the reconfigurable rectifier in a second configuration. The circuit may include a controller, wherein in response to a value of the ac input signal, the controller places the configuration switch in the first or second state.

In certain embodiments of the circuit, the first and second converters are provided as buck converters. For example, the first converter may be a provided as a resonant-transition buck converter and the second converter may be provided as an inverted resonant-transition buck converter.

In some embodiments, the circuit further comprises an energy buffer network having an input coupled to the outputs of the first and second converters and at least one energy storage element (e.g., a capacitor), the energy buffer circuit network configured to provide buffering of twice-line-frequency energy. The outputs of the first and second converters can be connected such that the energy buffer circuit appears across the sum of the output voltages of the first and second converters. In certain embodiments, the energy buffer circuit network comprises three capacitors connected in a delta fashion.

BRIEF DESCRIPTION OF THE DRAWINGS

The concepts, structures, and techniques sought to be protected herein may be more fully understood from the following detailed description of the drawings, in which.

Figure 1:
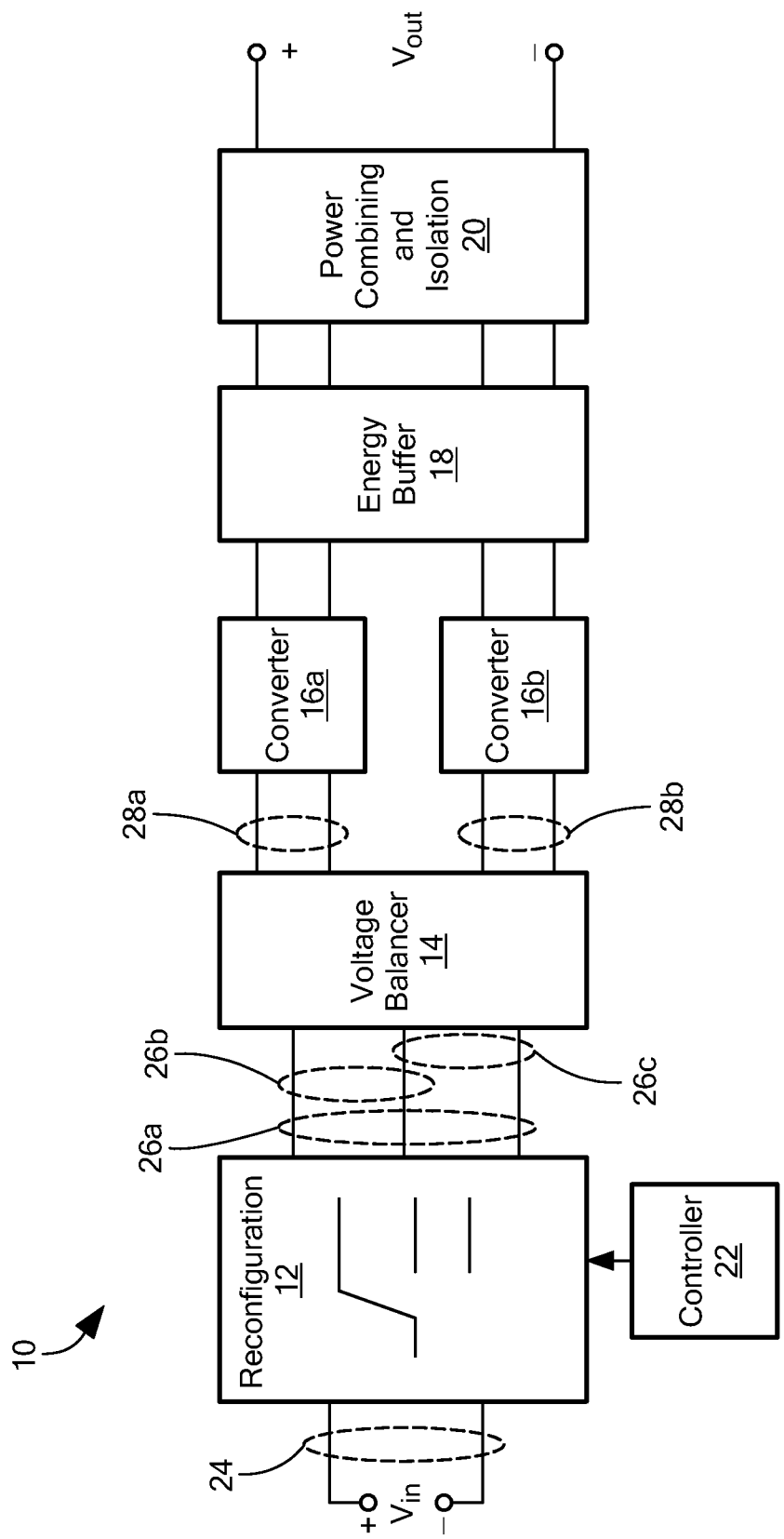
FIG. 1 is a block diagram of a power converter system architecture.

The drawings are not necessarily to scale, or inclusive of all elements of a system, emphasis instead generally being placed upon illustrating the concepts, structures, and techniques sought to be protected herein.

DETAILED DESCRIPTION

Before proceeding with a description of the architecture, systems, circuits and techniques described herein, some introductory concepts are explained. If a power converter draws energy from wide-input-range ac signal and provides low-voltage output dc, the converter system can be viewed as having two functional aspects. The first is a so-called "Power Factor Correction" (PFC) function, which refers to the ability of the circuit to draw energy from the wide-range ac input at high power factor, buffer the required energy and provide it for use. The second is an isolation, transformation, and regulation function. This includes providing electrical isolation between an ac input and a dc output, transforming whatever (usually large, e.g. 400 V) voltage is obtained from PFC to the (usually low, e.g., 24 V) output voltage, and regulating the output voltage in the face of load variations. Such a converter may be implemented using a "two-stage" architecture having a PFC stage and an isolation stage, with an energy buffer provided between the two stages. Alternatively, the PFC and isolation stages may partially or fully merge these two functions (i.e. a single set of circuitry may perform both of these functions.

The concepts, systems, circuits and techniques disclosed herein can reduce the required size of a power converter through substantial (e.g., >10×) increases in switching frequency relative to existing power converters, while maintaining high efficiency. It should also be appreciated that circuits designed using the concepts disclosed herein can be used to operate at lower frequencies with very high efficiency. Frequency increases can particularly benefit the size of magnetic components (e.g., inductors and transformers) that contribute substantially to converter size.

Achieving miniaturization may require careful attention to loss and parasitic effects that traditionally limit operation. Described herein are concepts, circuit architectures and topologies that take such effects into consideration. For example, with PFC circuitry interfacing to a high-voltage grid, it has been recognized that significant operational advantages can be gained by addressing switching loss through zero-voltage switching (ZVS) or near-ZVS operation. Even with advanced device types, high-efficiency conversion at greatly increased frequencies (e.g., above 1 MHz) generally requires that the high-voltage switches be turned on at relatively low voltage (ideally "zero" voltage) so as to dissipate only a relatively small amount of the energy stored in the device capacitances. Thus, the present disclosure includes circuit designs that provide ZVS or near-ZVS operation.

In addition to the benefits of ZVS soft switching, it has been recognized that in accordance with the concepts described herein parasitic effects may place constraints on switching frequency. In particular it has been recognized that at increased operating frequencies, the capacitances of high-voltage devices may become a design constraint.

As will become apparent from the description provided herein, the disclosure addresses these constraints through multiple features. First, circuit topologies that naturally operate with relatively small inductances and large capacitances (e.g., with low characteristic impedance) are utilized. Such topologies enable use of higher operating frequencies than would otherwise be possible. This, in part, suggests topologies that limit device voltages to as low values as possible, thereby minimizing voltage and increasing current (reduced characteristic impedance, $Z_0$). This drive towards topologies with low voltage stress is further driven by semiconductor device considerations: the capacitances of high-voltage devices tend to be intrinsically worse for those of low-voltage devices for a given power handling capability, such that the devices in high-voltage-stress designs place greater capacitive constraints on frequency than devices in lower-voltage-stress designs. Thus, some implementations disclosed herein utilize semiconductor devices having relatively low capacitances for a given voltage and current carrying capability (including GaN and SiC devices, when sufficiently economical from a system perspective).

Various circuits described herein utilize resonant-transition buck converters topologies. Resonant-transition buck converters can operate with high current ripple in the inductor and minimum transistor voltage stress, yielding a high achievable switching frequency and small inductor size. Moreover, while such converters operate with ZVS or near-ZVS soft switching over a 2:1 input voltage range, they can maintains high efficiency (with loss of ZVS but still low-loss switching) over an input voltage range of approximately 3:1.

The disclosure includes architectures that are reconfigurable such that the operating range of the individual components can be reduced, enabling better selection of components and operating ranges; and a reduction in the voltages (and ideally, minimizing the voltages) applied to individual power stage elements, enabling increases in frequencies as described above.

Referring to FIG. 1, a system architecture 10 can be used within a power conversion system to provide PFC functionality in addition to isolation, transformation, and regulation. The illustrative architecture 10 includes a reconfigurable rectifier 12, a voltage balancer 14, a plurality of converters (with two converters 16a and 16b being shown in this example), an energy buffer network 18, a power combination and isolation network 20, and a controller 22. The various architecture elements 12-22 may be coupled as shown or in any other suitable arrangement.

Reconfigurable rectifier 12 is provided having an input port 24 configured to receive an ac input signal (herein denoted $V_{in}$ and sometimes referred to as a "ac line voltage"), and having a plurality of output ports 26 (with three output ports 26a-26c shown in this example). As used herein, the term "port" refers to a pair of terminals (e.g., positive and a negative voltage terminals). A given terminal may be shared among two or more ports. For example, the three output ports 26a-26c may correspond to different combinations of only three distinct terminals, as shown.

The reconfigurable rectifier 12 receives an ac input signal at input port 24 and delivers power to one or more of the output ports 26 according to its instant configuration. For example, in some embodiments, the reconfigurable rectifier 12 supports two distinct configurations, wherein in a first configuration, the reconfigurable rectifier 12 delivers power continuously at a first output port 26a and, in a second configuration, the reconfigurable rectifier 12 delivers power to the second port 26b for a half line cycle, and to the third output port 26c for a different half line cycle. Various other configurations may be supported as discussed further below.

The reconfigurable rectifier 12 includes a switching element (referred to herein as a "configuration switch") having a first state to place the reconfigurable rectifier in a first configuration and a second state to place the reconfigurable rectifier in a second, different configuration. The configuration switch can be driven by a controller 22, which may be implemented as an application specific integrated circuit (ASIC) or in any other suitable form.

In certain embodiments, the controller 22 is configured to receive at least a portion of the ac input signal ($V_{in}$) and in response thereto to set the state of reconfigurable rectifier 12 based upon characteristics of the ac signal (e.g. a voltage amplitude level, or "voltage level," associated the ac input signal). For example, the controller may place the reconfigurable rectifier 12 into a first configuration state if a peak ac line voltage exceeds a predetermined threshold value (e.g., 200V) and may place the reconfigurable rectifier 12 into a second configuration state otherwise (e.g. if the peak ac line voltage is below a predetermined threshold).

It will be appreciated the use of a reconfigurable rectifier 12 can reduce (and ideally, minimize) voltage stress and operating range within subsequent conversion elements, such as converters 16.

The voltage balancer 14 is optional in some embodiments. Voltage balancer 14 includes an input coupled to the reconfigurable rectifier 12 and a plurality of outputs coupled to respective ones of the plurality of converters 16. In the example shown, an input of the voltage balancer 14 is coupled to the three output ports 26a-26c of reconfigurable rectifier 12, and two voltage balancer outputs 28a and 28b are coupled to converters 16a and 16b, respectively. The voltage balancer 14 is configured to balance power received at the input across the first and second outputs. For example, if the reconfigurable rectifier 12 alternates between delivering power at its second and third output ports 26b, 26c, the voltage balancer may balance the received power to continuously deliver an even amount of power at both its output ports 28a, 28b (and thus to each of the converters 16a, 16b).

The converters 16a, 16b receive rectified signals from the voltage balancer 14 (or directly from the reconfigurable rectifier 12) and provide (at outputs thereof), a desired output voltage (i.e. an output voltage signal having an output voltage level suitable for the needs of a particular application). As noted above, in some embodiments, the converters 16a, 16b are provided as resonant-transition buck converters. In certain embodiments, two converters 16a, 16b are provided in a so-called stacked arrangement, in which a first converter 16a is a provided as a resonant-transition buck converter and a second converter 16b is provided as an inverted resonant-transition buck converter. It should be appreciated that other topologies could be used for the converters 16a, 16b, such as boost or buck-boost topologies.

The energy buffer network 18 has an input coupled to the outputs of the converters 16a, 16b and at least one energy storage element, such as a capacitor. In some embodiments, the energy buffer network 18 comprises a "capacitor stack"—i.e., a set of one or more capacitors in which line-frequency energy is buffered (they may or may not comprise a physical "stack"). In operation, the converters 16a, 16b can operate at high frequency, drawing energy from an ac grid and charging the capacitors within the energy buffer network 18. The energy buffer network 18, in turn, provides buffered energy to subsequent stages.

The power combining and isolation network 20, which may not be included in all embodiments, combines power from multiple energy buffer outputs (which may corresponding to multiple "stacked" capacitors) into a single output. The network 20 may also provide conversion, isolation, transformation, and/or regulation functionality. In some embodiments, network 20 may be advantageously realized using two isolated telecom "brick" power supplies having their outputs tied either in series or in parallel. In other embodiments, network 20 may be advantageously realized as a multiple-input, single-output isolated dc-dc converter.

Figure 2:
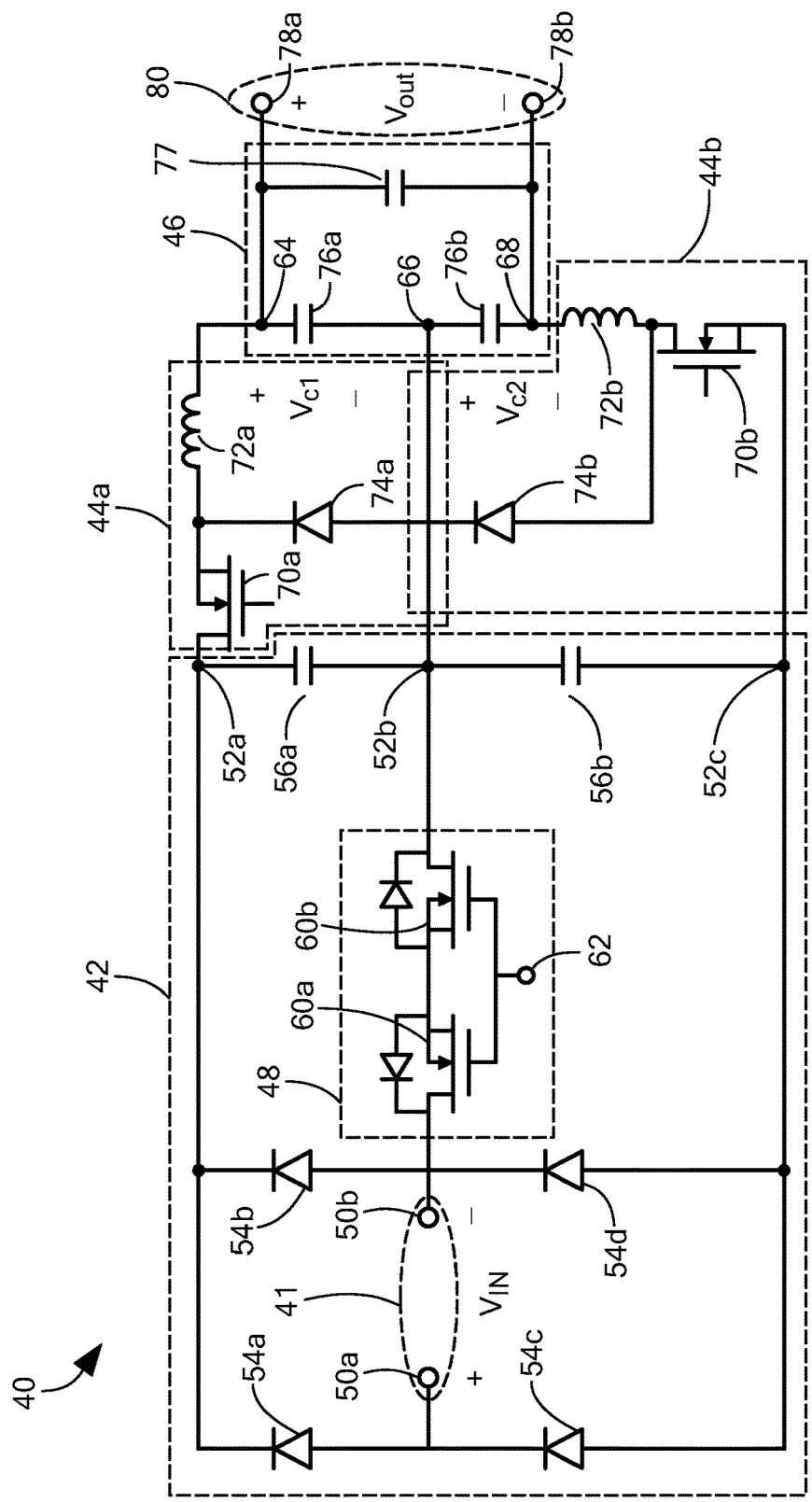
FIG. 2 is a schematic of an illustrative power converter.

Referring to FIG. 2, an illustrative circuit 40 has an input port 41 configured to receive an ac input signal ($V_{in}$) and a reconfigurable rectifier 42 coupled to the input port 41. A first converter 44a and a second converter 44b, are coupled to the reconfigurable rectifier 42 in a manner which allows converters 44a, 44b to receive and process different portions of the signal provided from reconfigurable rectifier 42. An energy buffer network 46 is coupled to the converters 44a, 44b and to an output port 80 to provide a regulated dc output voltage ($V_{out}$). It will be appreciated that the circuit 40 utilizes portions of the architecture 10 from FIG. 1 and may be used, for example, as a PFC stage in a power converter.

In the illustrative embodiment of FIG. 2, the reconfigurable rectifier 42 comprises a full bridge rectifier having a configuration switch 48 coupled thereto to selectively enable use of a third output terminal. In particular, the reconfigurable rectifier 42 includes first and second input terminals 50a and 50b (which may correspond to input port 41); first, second, and third output terminals 52a-52c; a first diode 54a coupled in a forward direction between the first input terminal 50a and the first output terminal 52a; a second diode 54b coupled in a forward direction between the second input terminal 50b and the first output terminal 52a; a third diode 54c coupled in a reverse direction between the first input terminal 50a and the third output terminal 52c; a fourth diode 54d coupled in a reverse direction between the second input terminal 50b and the third output terminal 52c; and a configuration switch 48 coupled between the second input terminal 50b and the second output terminal 52b.

The reconfigurable rectifier 42 may further include a first smoothing capacitor 56a coupled between the first and second output terminals 52a and 52b, and a second smoothing capacitor 56b coupled between the second and third output terminals 52b and 52c, as shown. The capacitance values of capacitors 56a, 56b are selected in accordance with the expected needs of a particular application and the specific capacitor characteristics are selected, at least in part, based upon the expected voltage levels and signal fluctuations to which the capacitors will be exposed. In particular, capacitors 56a and 56b may be selected to filter/bypass the switching frequency components of currents from converters 44a and 44b (with low impedance and small voltage ripple at those frequencies), while providing relatively high impedance to line-frequency currents from the reconfigurable rectifier 42 (with substantial voltage ripple at line frequency).

The configuration switch 48 may be provided as any suitable type of switch (e.g. provided from one or more switching elements). In some embodiments, the switch 48 is provided as a low-frequency, low-loss switch. In the illustrative embodiment of FIG. 2, the configuration switch 48 comprises a pair of field-effect transistor (FET) switches 60a, 60b arranged in series between nodes 50b and 52b (the terms "node" and "terminal" are used interchangeably herein). Alternatively, a relay, latching relay, solid-state relay, Triac, or 4-quadrant switch could be used.

Gate terminals of FET switches 60a, 60b may be coupled to a switch control terminal 62 which in turn may be coupled to a controller such as controller 22 described above in conjunction with FIG. 1. The controller (or other suitable circuit) provides gate bias signals to switch the FETs 60a, 60b between their conductive and non-conductive states corresponding, respectively, to "ON" (or "closed") and "OFF" (or "open") states of configuration switch 48. In it's OFF state, configuration switch 48 provides a high impedance path (ideally an open circuit impedance path) between nodes 50b and 52b. Conversely, its ON state, configuration switch 48 provides a low impedance path (ideally a shorts circuit impedance path) between nodes 50b and 52b. As noted above, configuration switch 48 may be driven by any suitable means. For reasons which will become apparent from the description herein below, in some embodiments, the configuration switch 48 is placed into its open state when the peak ac line voltage exceeds 200 V (or some other predetermined threshold voltage), and is placed into its a closed state otherwise.

Converters 44a, 44b may be provided with their inputs stacked in series, as shown. In particular, the converter 44a is provided having an input port corresponding to nodes 52a and 52b and an output port corresponding to nodes 64 and 66, whereas converter 44a is provided having an input port corresponding to nodes 52b and 52c and an output port corresponding to nodes 66 and 68.

The illustrative converter 44a comprises an active switch 70a and an inductor 72a serially coupled between nodes 52a and 64, and a diode 74a having an anode terminal coupled to nodes 52b and 66 and a cathode terminal coupled between the active switch 70a and the inductor 72a, as shown. The illustrative converter 44b includes an active switch 70b and an inductor 72b coupled in series between nodes 52c and 68, and a diode 74b having a cathode terminal coupled to nodes 52b and 66 and an anode terminal coupled between the active switch 70b and the inductor 72b, as shown. It will be appreciated that converters 44a, 44b both utilize a resonant-transition buck converter design, with the converter 44b being inverted relative to converter 44a. The inductors 72a, 72b may be selected to provide approximately 100% ripple ratio at the desired switching frequency range and to ring with diode 74b and switch capacitance for zero-voltage switching in a time significantly shorter than the desired switching period for an operating point. Illustrative designs of such resonant-transition buck converters (either inverted or noninverted) are described in Lim, et. al. "Two-Stage Power Conversion Architecture Suitable for Wide Range Input Voltage", IEEE Transactions on Power Electronics, Vol. 30, No. 2, pp. 805-816, February 2015.

In this illustrative embodiment, converters 44a, 44b are coupled across a single output port formed by energy storage elements 76a, 76b (here shown as capacitors 76a, 76b) coupled between nodes 64 and 68. In other embodiments, each converter provides a separate output port. In such embodiments, a power combining circuit may be included to combine the individual converter outputs.

In some embodiments, capacitors 76a and 76b may be selected to principally filter the switching frequency components of the outputs of buck converters 44a and 44b, while capacitor 77 (at higher voltage and higher energy storage capability) may provide buffering of twice-line-frequency energy and/or holdup energy to power the system output in the event of a temporary interruption in line power. In other embodiments, these duties—twice-line-frequency energy buffering, holdup energy and switching ripple filtering—may be distributed among the three capacitor elements 76a, 76b, and 77. It is also noted that while single capacitors 76a, 76b, and 77 are shown, these may each be realized as paralleled capacitors of similar and/or different types, including ceramic capacitors, film capacitors and electrolytic capacitors. Electrolytic capacitors may be preferable for energy buffering, while film and ceramic capacitors may be preferred for switching ripple filtering.

The illustrative energy buffer network 46 includes an input port corresponding to nodes 64 and 68, an output port 80 corresponding to nodes 78a and 78b, and a plurality of stacked output capacitors 76 (with two output capacitors 76a and 76b shown in this example). A first output capacitor 76a may be coupled between nodes 64 and 66 and a second output capacitor 76b coupled between nodes 66 and 68. The energy buffer network 46 may also include a capacitor 77 coupled in parallel with the output capacitors 76, as shown.

In various embodiments, capacitor 77 has a substantially larger capacitance compared to capacitors 76a, 76b.

The minimum size of capacitors 76a and 76b may be selected such that they can pass the switching ripple current from inductors 72a and 72b with small switching voltage ripple. In embodiments when capacitor 77 provides the dominant energy buffering element, its minimum size may be selected to provide buffering of the twice-line-frequency energy with relatively small voltage ripple and to provide a sufficient rms current rating to pass the twice-line-frequency current components. Twice-line-frequency energy may be, for example, on the order of $P_{average}/(2\pi^* f_{line})$, where $P_{average}$ is the maximum average system output power and $f_{line}$ is the minimum ac line frequency) with relatively small voltage ripple and has a sufficient rms current rating to pass the twice-line-frequency current components. In applications where holdup energy is required, capacitor 77 may be sized such that it can provide the desired output power for the required duration with acceptable voltage droop for the following stage. In cases where both capacitors 76a and 76b provide energy buffering, the net storage of the three capacitors 76a, 76b, and 77 can be sized according to the above guidelines.

It should be appreciated that capacitors 76a, 76b, and/or 77 may be implemented either as part of the converter circuit, as part of an energy buffer circuit, or both.

The circuit 40 can operate to provide ac to dc power conversion over a wide range of peak ac input voltages (e.g., 85-264 Vrms) and is suitable for operation in the mega-Hertz (MHz) frequency range.

The instantaneous operation of the converters 44a, 44b depends upon the reconfigurable rectifier 42, which in turn depends on the state of the configuration switch 48. With the configuration switch 48 in the open state (e.g., for operation with ac line voltages above predetermined threshold voltage—e.g. 200 V), the reconfigurable rectifier 42 functions as a full-wave rectifier delivering power across the first and third output terminals 52a, 52c (which may correspond to first output port). Thus, the two converters 44a, 44b draw the same current from the input (sharing input voltage equally) and deliver the same current to the combined output (i.e., across terminals 64, 68).

With the configuration switch 48 in the closed state (e.g., for operation with ac line voltages less than or equal to the predetermined threshold voltage—e.g. 200 V), the reconfigurable rectifier 42 functions similar to a voltage doubler. The top converter 44a operates when the ac line voltage is positive and the bottom converter 44b operates when the ac line voltage is negative. Thus, each converter 44a, 44b operates to process full power for approximately half the line cycle.

As a consequence of this circuit reconfiguration, the HF converters 44a, 44b can be optimized for a narrower operating range (voltage and currents ranges) and can operate at lower voltage compared to conventional approaches. These factors both facilitate scaling the power stage to high frequency. In particular, the converters 44a, 44b can be rated for a peak input voltage of half the maximum ac input voltage, and for an rms input current that is only 0.707 times the maximum rms ac input current. In one example, with peak input voltages of each of the stacked converters 44, 44b below 200 V, high efficiency can be achieved for output of the converters 44a, 44b, each in the range of 65-85 V, for a total output voltage selected in the range of 130-170 V (where the actual output voltage may be selected based on desired output voltage and input power factor).

The pair of converters 44a, 44b can operate as a soft-switched HF power stage. Combined with the circuit reconfiguration, the stacked arrangement of the converters 44a, 44b reduces the individual input voltages of the converters (e.g., to <200 V each) for "universal" ac input voltage (e.g., input voltage in the range 85-264 Vrms). Moreover, the topology used for the converters 44a, 44b can operate with minimum voltage stress and using relatively small magnetic components at high efficiency. Each of these factors benefits achieving greatly increased frequency.

The size of the electrical components (e.g., capacitors and inductors) used with the circuit 40 may be selected based on the desired PFC output voltage (Vout) and the required input power factor. Line-frequency energy and holdup energy buffering is done by the output capacitors, and required energy buffer capacitor size can be reduced by allowing a greater swing across the output capacitor.

FIGS. 3A-3F illustrate the operation of circuit 40 (FIG. 2) for various ac input voltages. Each of FIGS. 3A-3F shows a graph of electrical characteristics (voltage and current) at a particular node (or pair of nodes) with the circuit. Within each of the FIGS. 3A-3F, time is indicated by the x axis, voltage is indicated by a respective voltage waveform 90a-90f and by the left-side y axis, and current is indicated by a respective current waveform 92a-92f and by the right-side y axis.

Figure 3A:
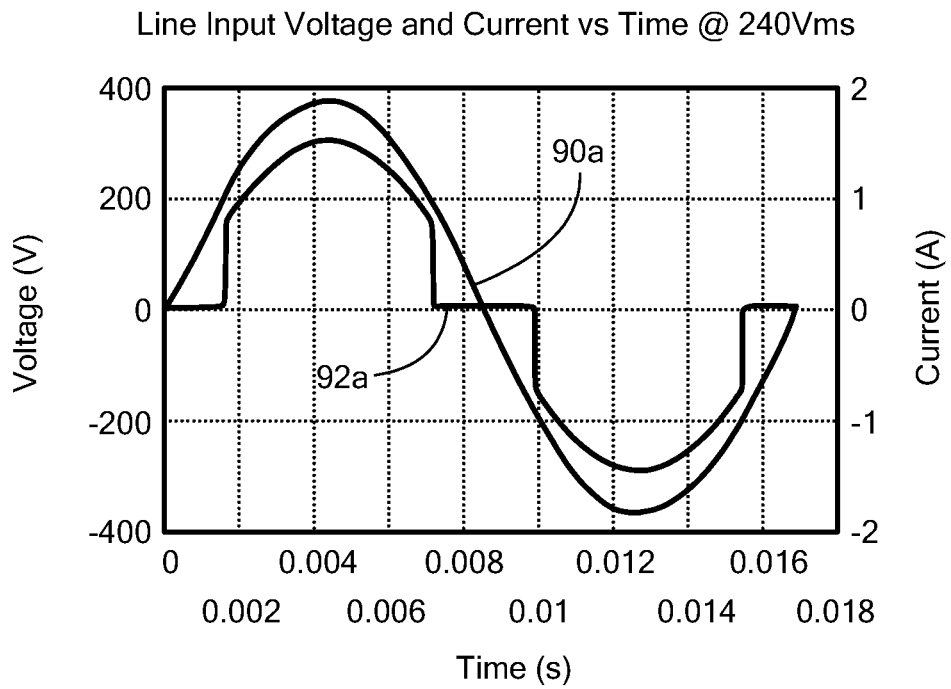
FIGS. 3A-3F are a series of plots of voltage vs. time illustrating the operation of a circuit that can be used as a power converter.
Figure 3B:
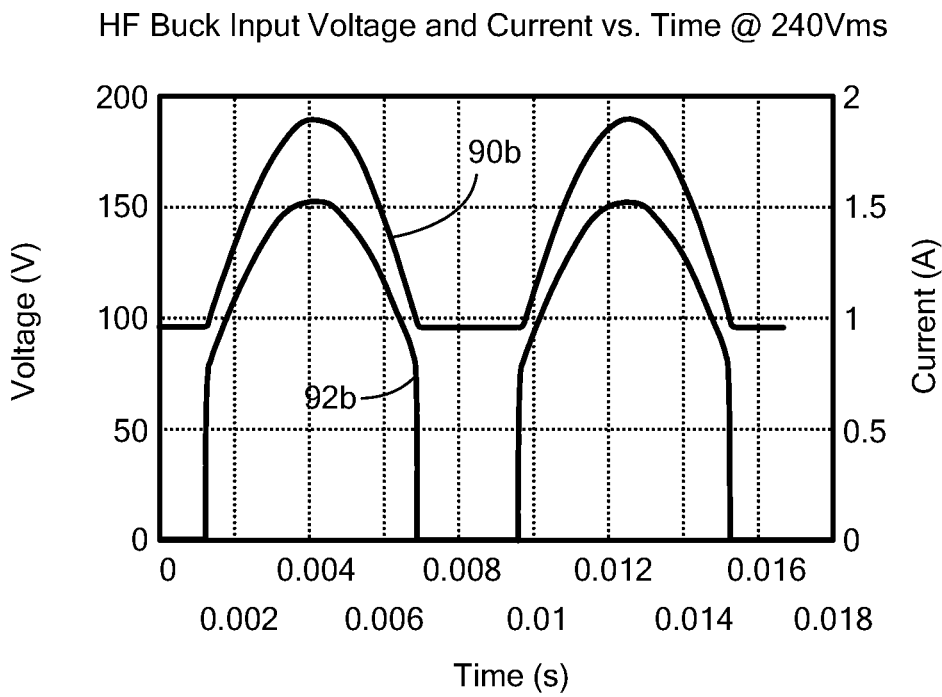
Figure 3C:
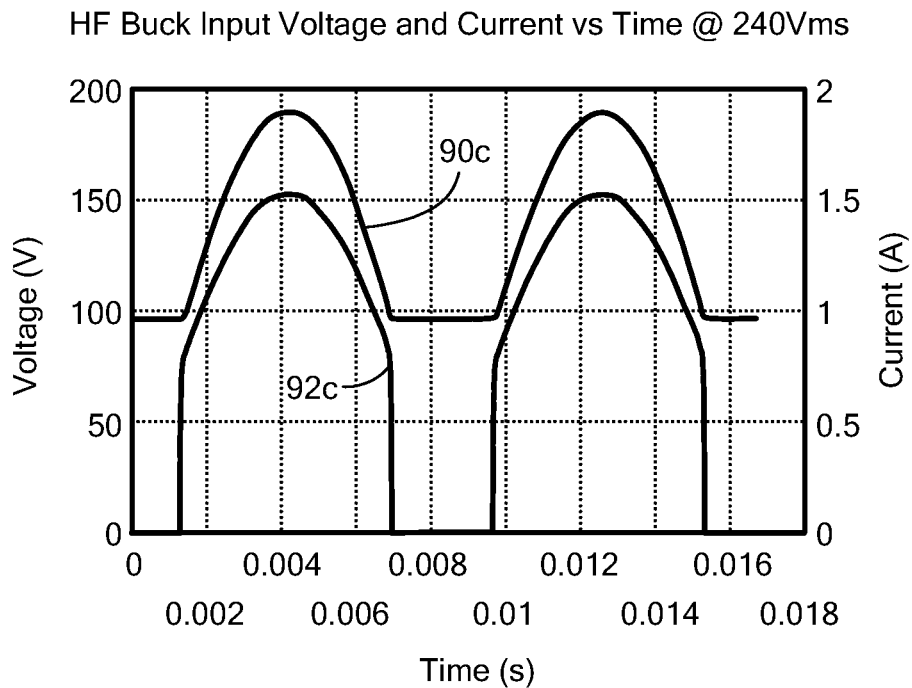

FIG. 3A illustrates voltage 90a and current 92a of a 240 Vrms ac input signal over one line cycle (60 Hz). The voltage 90a and current 92a may correspond to measurements taken at input port 41 of FIG. 2. FIGS. 3B and 3C illustrate voltage and current delivered to the top converter 44a and the bottom converter 44b, respectively, in response to the input signal of FIG. 3A when the configuration switch 48 is open. With the configuration switch open, each converter 44a, 44b operates at 120 Hz conducting every half-line cycle, as shown.

Figure 3D:
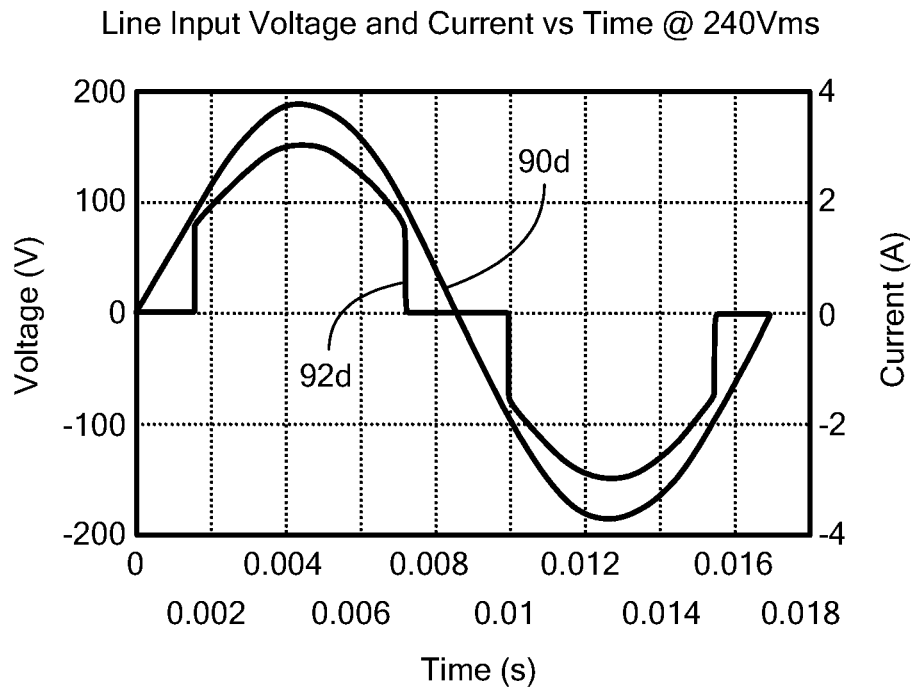
Figure 3E:
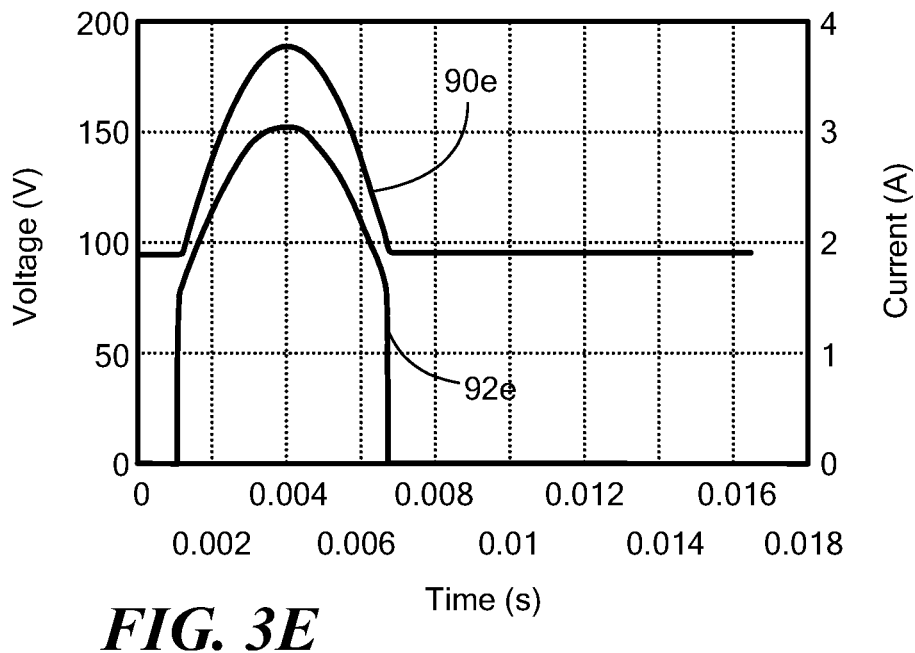
Figure 3F:
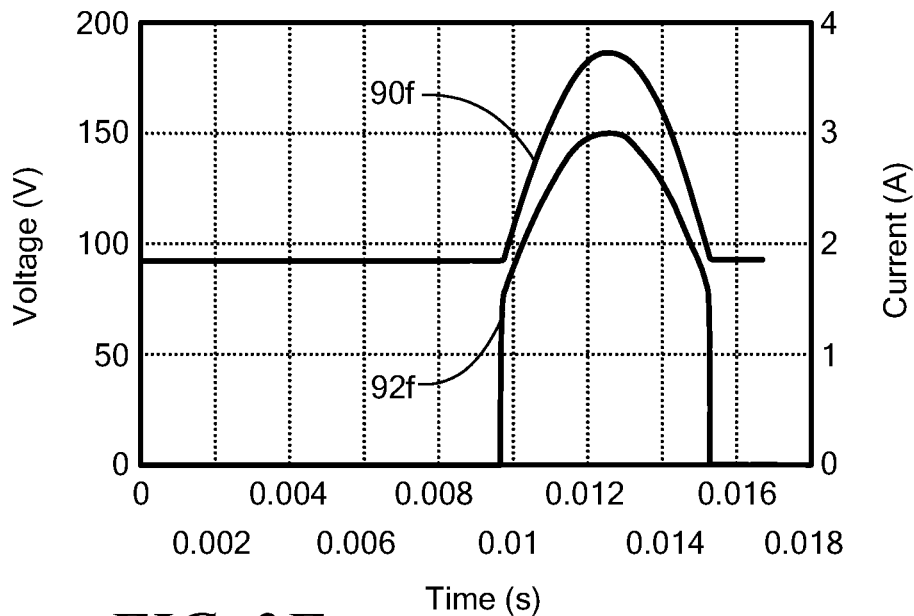

FIG. 3D illustrates voltage 90d and current 92d of a 120 Vrms ac input signal over one ac cycle (60 Hz). FIGS. 3E and 3F illustrate voltage and current delivered to the top converter 44a and the bottom converter 44b, respectively, in response to the input signal of FIG. 3D when the configuration switch 48 is closed. With the configuration switch closed, the top converter 44a conducts when the line voltage is positive, and the top converter 44b conducts when the line voltage is negative, as shown.

As shown in FIGS. 3A-3F, when operating with the configuration switch 48 closed (e.g., with a 120 Vrms input), the converters 44a, 44b may be required to process twice the peak power over a line cycle compared to operation with the configuration switch 48 open (e.g., with a 240 Vrms input). This is because the converters 44a, 44b each operate only half the time. Thus, the converters 44a, 44b must designed for a larger peak power, which may require using larger component sizes (e.g., larger-volume inductors 72a, 72b).

Figure 4:
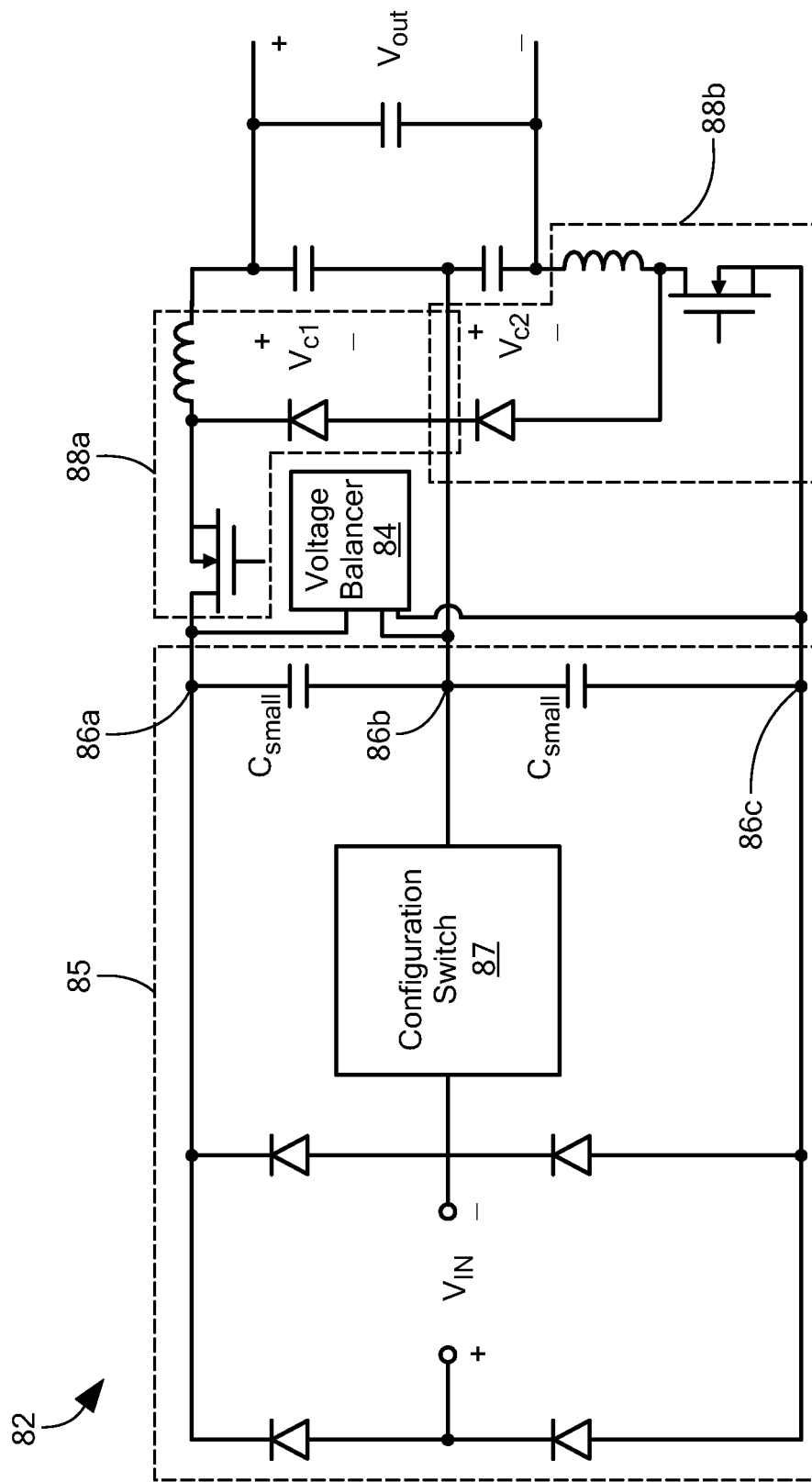
FIGS. 4-6 are a series of schematic diagrams showing additional circuits that may be used within a power converter.

Referring to FIG. 4, a circuit 82 is similar to circuit 40 of FIG. 2, but includes a voltage balancer 84 coupled between a reconfigurable rectifier 85 and stacked converters 88a, 88b. In particular, the voltage balancer 84 may be coupled to three output terminals 86a-86c of the reconfigurable rectifier 85, as shown.

The voltage balancer 84 is configured to distribute energy to both converters 88a, 88b (preferably equally) when a configuration switch 87 is closed. With this configuration, the converters 88a, 88b can operate during the same fraction of the line cycle and draw the same current regardless of whether the configuration switch 87 is open or closed.

Figure 7:
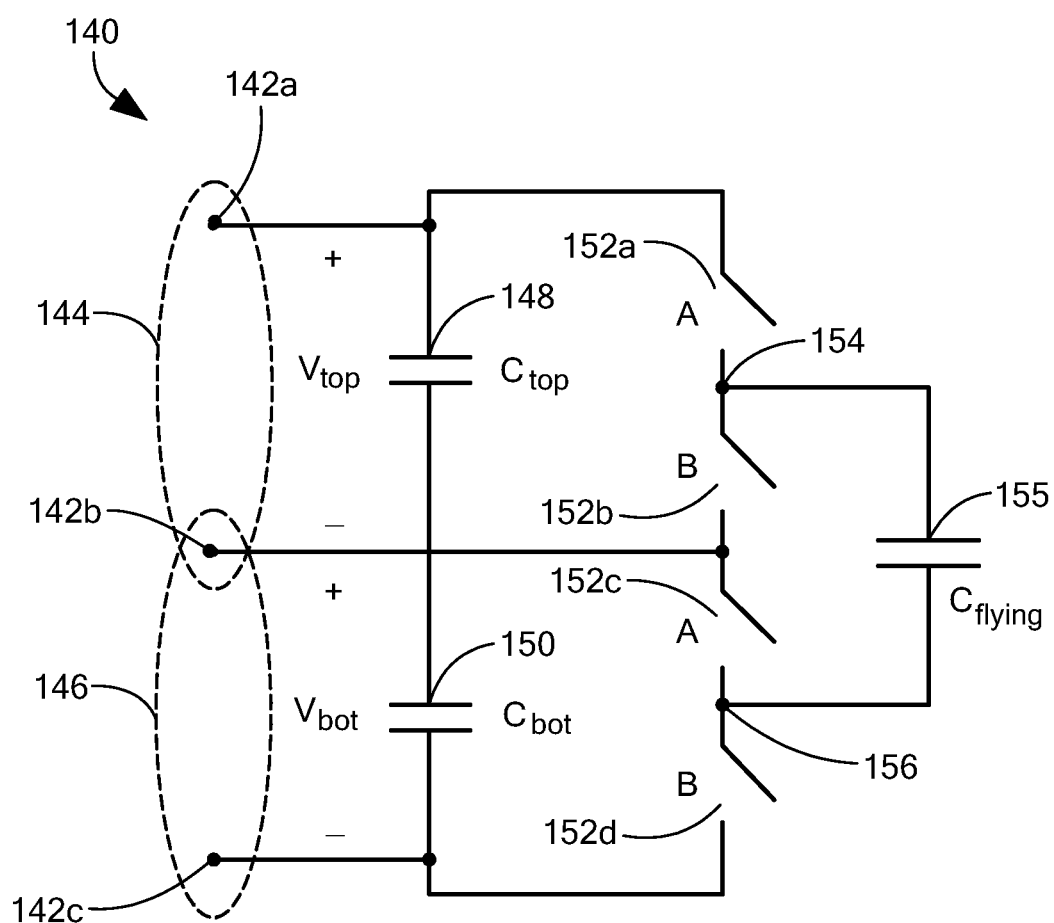
FIGS. 7 and 8 are schematic diagrams showing circuits that may be used within a voltage balancer.
Figure 8:
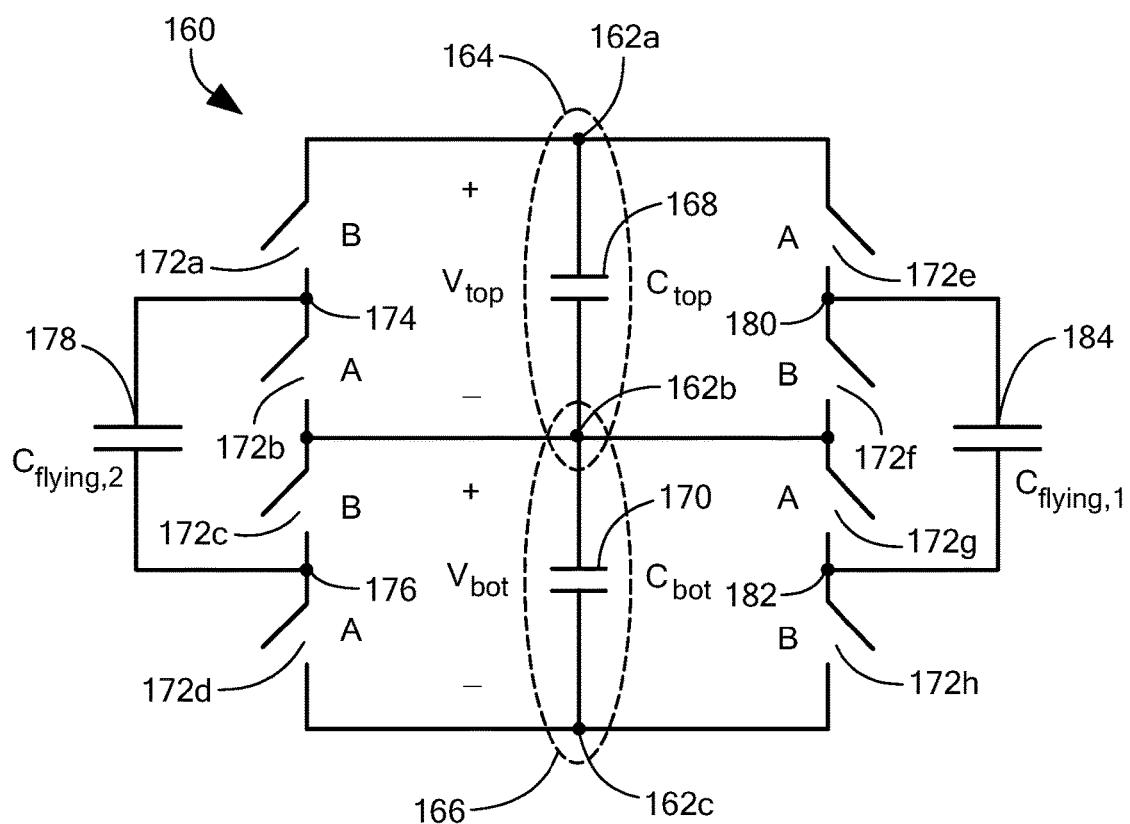

Thus, the peak power rating of the converters 88a, 88b can be reduced compared to circuit design of FIG. 2. Example implementations of a voltage balancer 84 are shown in FIGS. 7 and 8 and described below in conjunction therewith.

Figure 5:
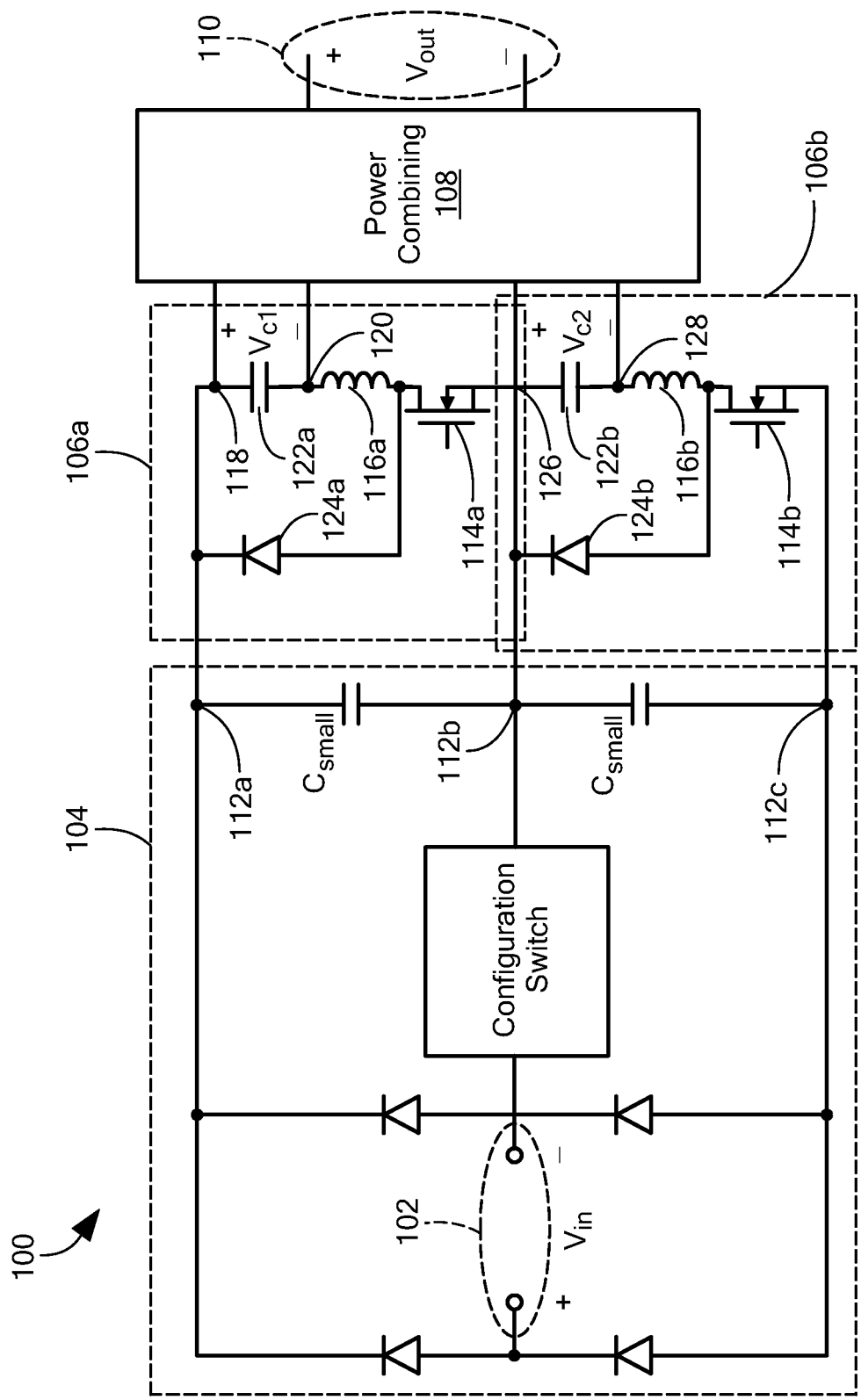

FIG. 5 illustrates a circuit design for use in a power conversion system. One limitation of the circuit design of FIG. 2 is that one of the HF buck converters (i.e., converter 88a) has its active switch referenced to a so-called "flying node" (i.e., a node coupled to receive relatively high-frequency signals). This approach may limit the frequency or efficiency at which that converter can operate. The circuit design of FIG. 5 removes this limitation by using two "inverted" resonant-transition buck converters, both of which have their switches referenced to relatively slowly moving nodes. With this design, the HF stage has two separate outputs that must be combined, either by a dedicated non-isolated combing stage or by an isolation/transformation/regulation stage.

Turning to FIG. 5, an illustrative circuit 100 comprises an input port 102 configured to receive an ac input signal ($V_{in}$); a reconfigurable rectifier 104 coupled to the input port 102; a first ("top") converter 106a and a second ("bottom") converter 106b, both of which are coupled to the reconfigurable rectifier 102; and a power combining circuit 108 coupled to both converters 106a, 106b and configured to provide combined output voltage ($V_{out}$) at an output port 110. It will be appreciated that the circuit 100 utilizes portions of the architecture 10 from FIG. 1 and may be used, for example, as a PFC stage in a power converter.

The reconfigurable rectifier 104, which has first, second, and third output terminals 112a-112c, may be the same as or similar to the reconfigurable rectifier 42 of FIG. 2.

Both the top and bottom converters 106a, 106b in FIG. 5 maybe the same as or similar to the bottom converter 44b of FIG. 2. That is, both converters 106a, 106b may utilize an inverted buck converter design, including an inverted resonant-transition buck converter.

The illustrative top converter 106a includes a first output terminal 118 coupled to node 112a, a second output terminal 120, an energy storage element 122a (here shown as a capacitor 122a) coupled between the first and second output terminals 118, 120, an active switch 114a and an inductor 116a coupled in series between nodes 112b and 120, and a diode 124a having a cathode terminal coupled to node 112a and an anode terminal coupled between the active switch 114a and the inductor 116a, as shown.

The illustrative bottom converter 106b includes a first output terminal 126 coupled to node 112b, a second output terminal 128, an energy storage element 122b (here shown as a capacitor 122b) coupled between the first and second output terminals 126, 128, an active switch 114b and an inductor 116b coupled in series between nodes 112c and 128, and a diode 124b having a cathode terminal coupled to nodes 112b and an anode terminal coupled between the active switch 114b and the inductor 116b, as shown.

Thus, whereas the stacked converters 44a, 44b of FIG. 2 provide a single output port (i.e., across nodes 64 and 68), the converters 106a and 106b in FIG. 5 each provides a separate output, denoted Vc1 and Vc2, respectively. In circuit 100, capacitors 122a and 122b may thus provide both ripple frequency filtering and energy buffering, including twice-line-frequency energy buffering and providing holdup energy in the case of a temporary interruption of the ac line voltage.

The power combining circuit 108 is configured to combine the two converter outputs Vc1 and Vc2. The circuit 108 may also provide other functionality, such as buffering, isolation, transformation, and/or regulation. The power combining circuit 108 can be implemented using any suitable circuit design.

One approach to efficiently combining the two converter outputs is to use a switched-capacitor power combining circuit. Since relatively large capacitors must be already present in the system to satisfy holdup and line-frequency energy buffering requirement, a switched-capacitor power combining stage can be implemented with very high efficiency and negligible impact on size.

A second approach to combining the two converter outputs Vc1 and Vc2 is to realize the circuit 108 as an isolation/transformation/regulation stage. Because the individual outputs Vc1, Vc2 can be selected to have voltages in the range below 75 V, one can realize the circuit 108 with a pair of standard high efficiency "brick" converters with their inputs connected to Vc1 and Vc2, respectively, and their outputs connected in series or parallel on the isolated output side to supply a voltage (Vout) at output port 110. Control can be realized through appropriate modulation of the current sharing and enable controls often provided in such converters. This design approach can thus take advantage of standardized high-volume converter designs for the second stage. This may even enable elimination of downstream conversion stages (e.g., to logic-level voltages) in some applications.

A third approach to implementing the power combining circuit 108 is to realize a true dual-input, single-output magnetic stage (e.g., including isolation). Such a design, when customized to the application, can achieve higher densities and efficiencies that are possible with standard "brick" style converters. Moreover, this approach is amendable to being realized at high frequencies using "integrated magnetics," in which multilayer transformers are printed as part of the circuit board.

Figure 6:
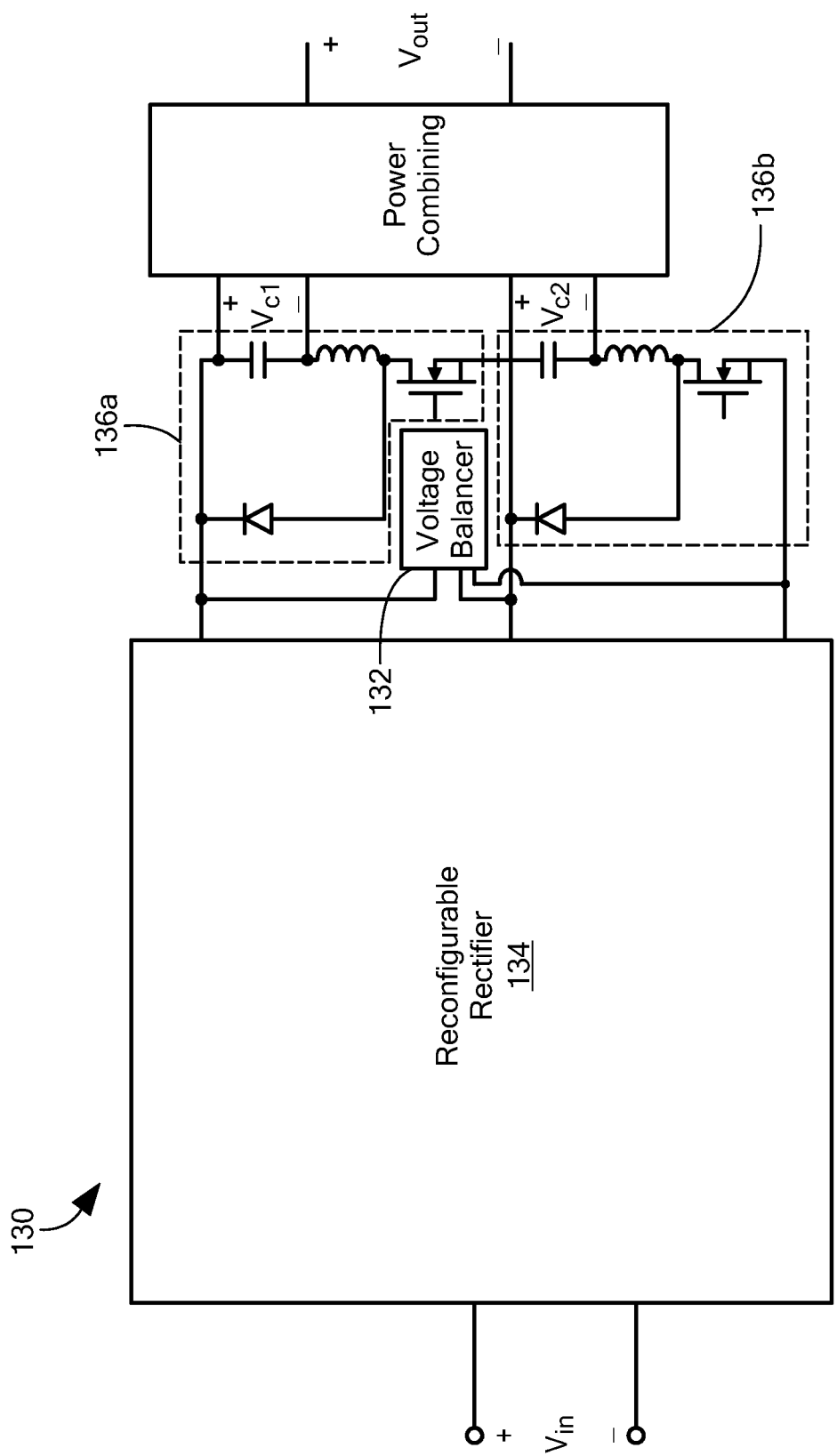

Referring to FIG. 6, a circuit 130 is similar to circuit 100 of FIG. 5, but includes a voltage balancer 132 coupled between a reconfigurable rectifier 134 and two converters 136a, 136b. As explained above in conjunction with FIG. 4, a voltage balancer 132 can be configured to distribute energy to both converters 136a, 136b (preferably equally) in response to a first configuration of reconfigurable rectifier 134 (e.g. when a configuration switch is closed). Thus, in operation, both converters 136a, 136b operate during the same fraction of the line cycle and draw the same current regardless of whether the configuration switch is open or closed and the peak power rating of the HF buck converters 136a, 136b can be reduced compared to the design of FIG. 5.

FIGS. 7 and 8 show illustrative circuit designs that may be used within a voltage balancer, such as voltage balancer 84 in FIG. 4 and/or voltage balancer 132 in FIG. 6. It will be appreciated that while FIGS. 7 and 8 show switched-capacitor voltage balancers, one may also utilize switched inductor voltage balancers, resonant switched capacitor voltage balancers, and other known balancer circuits.

Referring to FIG. 7, an illustrative circuit 140 comprises a first port 144 corresponding to terminals 142a and 142b, a second port 146 corresponding to terminals 142b and 142c, a first capacitor 148 coupled across the first port 144, a second capacitor 150 coupled across the second port 146, a first switch 152a coupled to nodes 142a and 154, a second switch 152b coupled to nodes 154 and 142b, a third switch 152c coupled to nodes 142b and 156, a fourth switch 152d coupled to nodes 156 and 142c, and a third capacitor 155 coupled to nodes 154 and 156. Capacitance values can be selected to provide the desired peak energy transfer rated at a desired switching frequency and efficiency in accordance with well-known design approaches for switched-capacitor converters, such as described in M. Seeman and S. Sanders, "Analysis and Optimization of Switched-Capacitor DC-DC Converters," IEEE Transactions on Power Electronics, vol. 23, no. 2, March 2008.

Each of the switches 152a-152d has an open state (i.e., a state in which a substantially open circuit impedance path exists between the switch terminals) and a closed state (i.e. a state in which a substantially short circuit impedance path exists between the switch terminals). The first and third switches 152a and 152c (collectively referred to as switch "A") may be configured to be opened and closed in unison. Likewise, the second and fourth switches 152b and 152d (collectively referred to as switch "B") may be configured to be opened and closed in unison. The switches can be driven by any suitable means, such as via controller 22 shown in FIG. 1.

In one embodiment, switches A and B are operated in complementary fashion (i.e. when one is on the other is off), as shown in TABLE 1. The switches A and B may each be operated with 50% duty ratio. As a result, the third (or "flying") capacitor 155 shuffles charge from the first (or "top") capacitor 148 to the second (or "bottom") capacitor 150, or vice versa. For practice control reasons, all switches may be turned off for a least a portion of the duty cycle (sometimes referred to as "dead times").

TABLE 1

| | Switch | |
|---|---|---|
| | A | B |
| State 1 | Open | Closed |
| State 2 | Closed | Open |

The circuit 140 can function as a voltage balancer coupled between a reconfigurable rectifier and a pair of converters. In particular, the three terminals 142a-142c may be coupled to three output terminals of the reconfigurable rectifier. For example, the terminals 142a, 142b, and 142c may be coupled to terminals 86a, 86b, and 86c of FIG. 4, respectively. If the switching frequency of circuit 140 is significantly higher than ac input line frequency, a voltage level (Vtop) at the first port 144 will have approximately the same value in steady state as the voltage level (Vbot) at the second port 146. Thus, the circuit 140 can provide approximately equal voltages to both converters (e.g., converters 88a and 88b of FIG. 4) regardless of whether the configuration switch is open or closed.

The switching frequency of circuit 140 can be dynamically adapted over the line cycle and/or with power to maximize efficiency, and it can be entirely turned off when the configuration switch is open (e.g., when a signal having a voltage level above a predetermined threshold level is provided to the input of a reconfigurable rectifier such as reconfigurable rectifier 42 in FIG. 2).

FIG. 8 shows another illustrative circuit 160 that can be used within a voltage balancer. The illustrative circuit 160 comprises a first port 164 corresponding to terminals 162a and 162b, a second port 166 corresponding to terminals 162b and 162c, a first capacitor 168 coupled across the first port 164, a second capacitor 170 coupled across the second port 166, a first switch 172a coupled to nodes 162a and 174, a second switch 172b coupled to nodes 174 and 162b, a third switch 172c coupled to nodes 162b and 176, a fourth switch 172d coupled to nodes 176 and 162c, a third capacitor 178 coupled to nodes 174 and 176, a fifth switch 172e coupled to nodes 162a and 180, a sixth switch 172f coupled to nodes 180 and 162b, a seventh switch 172g coupled to nodes 162b and 182, an eighth switch 172h coupled to nodes 182 and 162c, and a fourth capacitor 184 coupled to nodes 180 and 182. These capacitor values may be selected for a given desired switching frequency (which may be in the tens to hundreds of kHz in many applications) based on well-known design principles as described above in conjunction with FIG. 7.

The interleaved circuit design shown in FIG. 8 has twice as many switches and drivers as the circuit 140 of FIG. 7, but has the advantage of requiring smaller overall capacitance and reducing the current ripple significantly, effectively decreasing the volume of input-side filters, such as EMI filters.

The four switches 172b, 172d, 172e, and 172g (collectively referred to as switch "A") are may be configured to be opened and closed in unison. Likewise, the four switches 172a, 172c, 172f, and 172h (collectively referred to as switch "B") are may be configured to be opened and closed in unison. The two switches A and B may be operated in complementary fashion, as shown in TABLE 1 and as described above in conjunction with FIG. 7. In operation, the third and fourth capacitors 178 and 184 "shuffle" charge from the first capacitor 168 to the second capacitor 178, and vice versa. Each half of the circuit operates 180 degrees out of phase, which can cancel a current ripple in capacitors 168 and 170.

As with circuit 140 of FIG. 7, the circuit 160 can be coupled between a reconfigurable rectifier and a pair of converters, and the switching frequency of circuit 140 can be dynamically adapted over the line cycle and/or with power to maximize efficiency.

Figure 9:
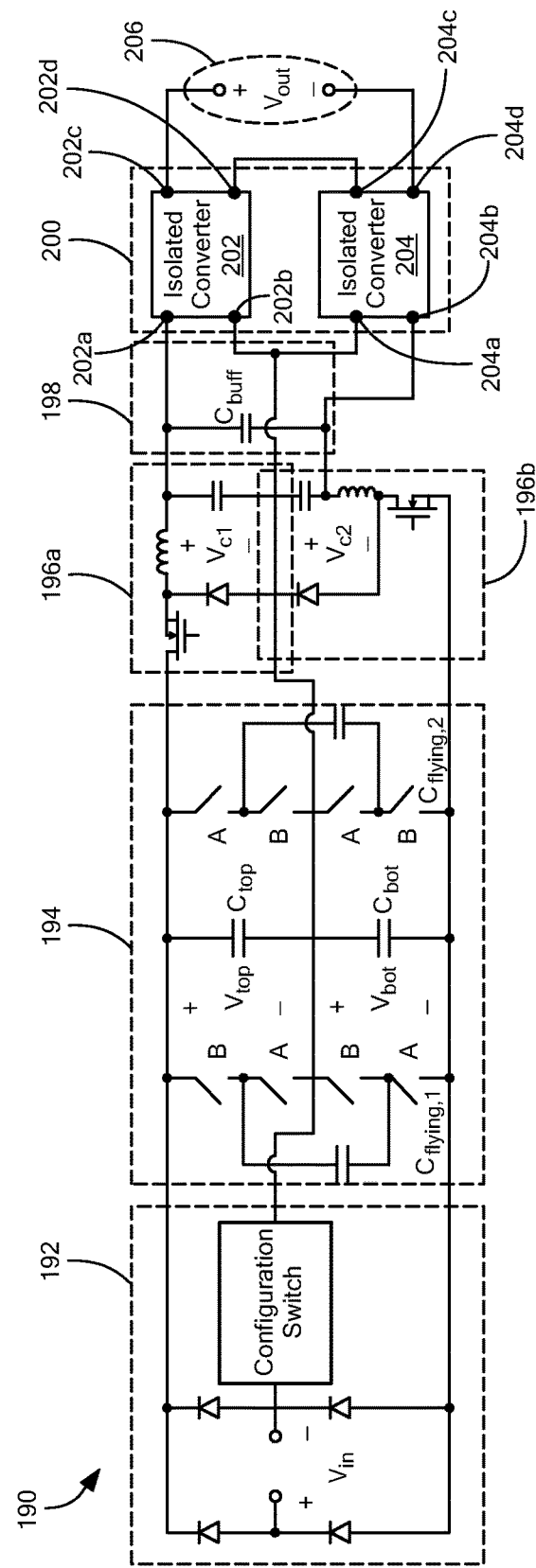
FIGS. 9-12 are schematic diagrams showing additional circuits that may be used within a power converter.
Figure 10:
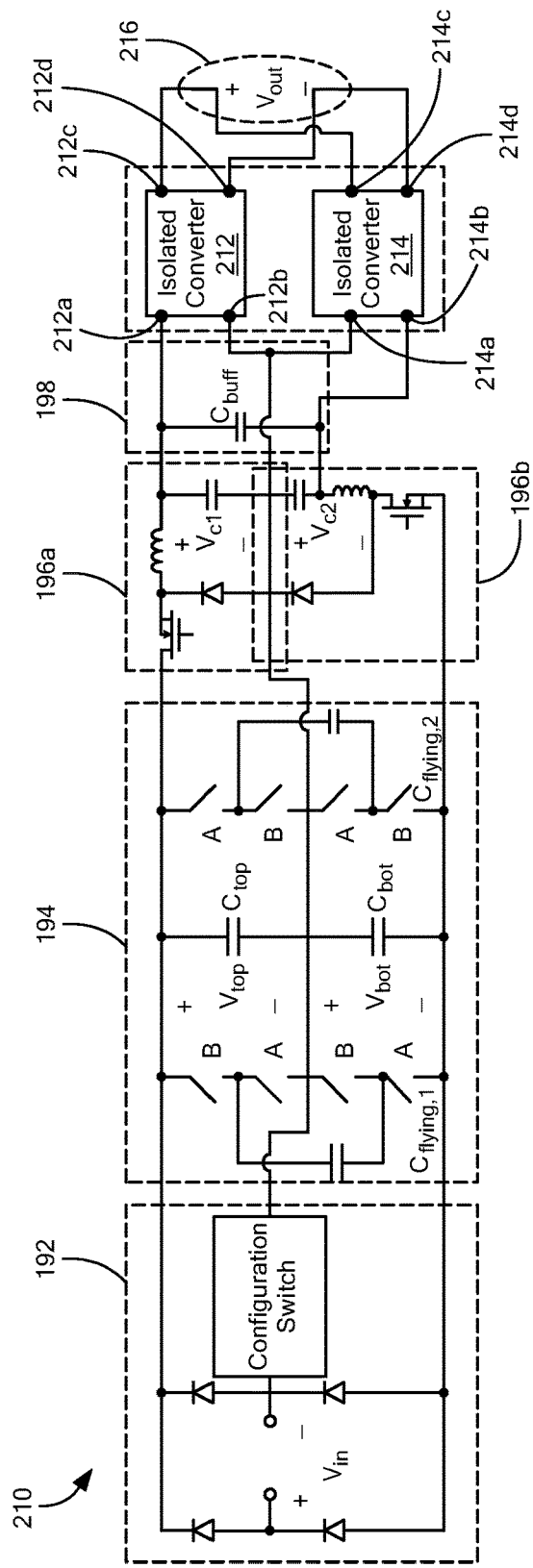

FIGS. 9 and 10 show how industry standard telecom converters (e.g., "brick" converters, "half-brick" converters, "quarter-brick" converters, "eighth brick" converters, etc.) can be used within a power combining and isolation circuit (e.g., circuit 20 of FIG. 1). Such converters have galvanic isolation, which allows the outputs to be coupled in series or parallel, depending on the desired output voltage and what is best available among such converters in the marketplace. For example, for a 100 W PFC converter, each output brick converter might be designed to operate at 50 W and a 5 V output. Depending on the application, the outputs of the brick converters could be coupled in such a way to obtain an output of 5 V and 20 A (outputs coupled parallel) or 10 V and 10 A (outputs coupled in series).

Referring FIG. 9, an illustrative circuit 190 includes a reconfigurable rectifier 192, a voltage balancer circuit 194, two converters 196a and 196b, an energy buffer circuit 198, and a power combining and isolation circuit 200. The circuit portions 192-200 may be coupled as shown, or in any other suitable manner.

The power combining and isolation circuit 200 includes two isolated converters 202 and 204, which may be provided as standard telecom converters. A first isolated converter 202 includes a first input terminal 202a, a second input terminal 202b, a first output terminal 202c, and a second output terminal 202d. A second isolated converter 204 includes a first input terminal 204a, a second input terminal 204b, a first output terminal 204c, and a second output terminal 204d. The isolated converter outputs are coupled in series, with the second output terminal 202d of converter 202 coupled to the first output terminal 204c of converter 204. The input terminals of the isolated converters 202, 204 can be coupled such that each converter is fed from one of the converters 196a, 196b, as shown.

The first output terminal 202c of the converter 202 and the second output terminal 204d of the converter 204 may correspond to the output port 206 of the circuit 190.

Referring to FIG. 10 in which like elements of FIG. 9 are shown having like reference designations, a circuit 210 includes two isolated converters 212 and 214, whose outputs may be coupled in parallel. A first isolated converter 212 includes a first input port 212a, a second input port 212b, a first output port 212c, and a second output port 212d. A second isolated converter 214 includes a first input port 214a, a second input port 214b, a first output port 214c, and a second output port 214d. The first output terminal 212c of converter 212 may be coupled to the first output terminal 214c of converter 214, and the second output terminal 212d of converter 212 may be coupled to the second output terminal 214d of converter 214, as shown. An output port 216 of the circuit 210 corresponds to terminals 212c/214c and 212d/214d. It is appreciated that connecting the isolated converter outputs in parallel effectively provides the converter with two different regulated output voltages that can be realized depending on the desired application.

Figure 11:
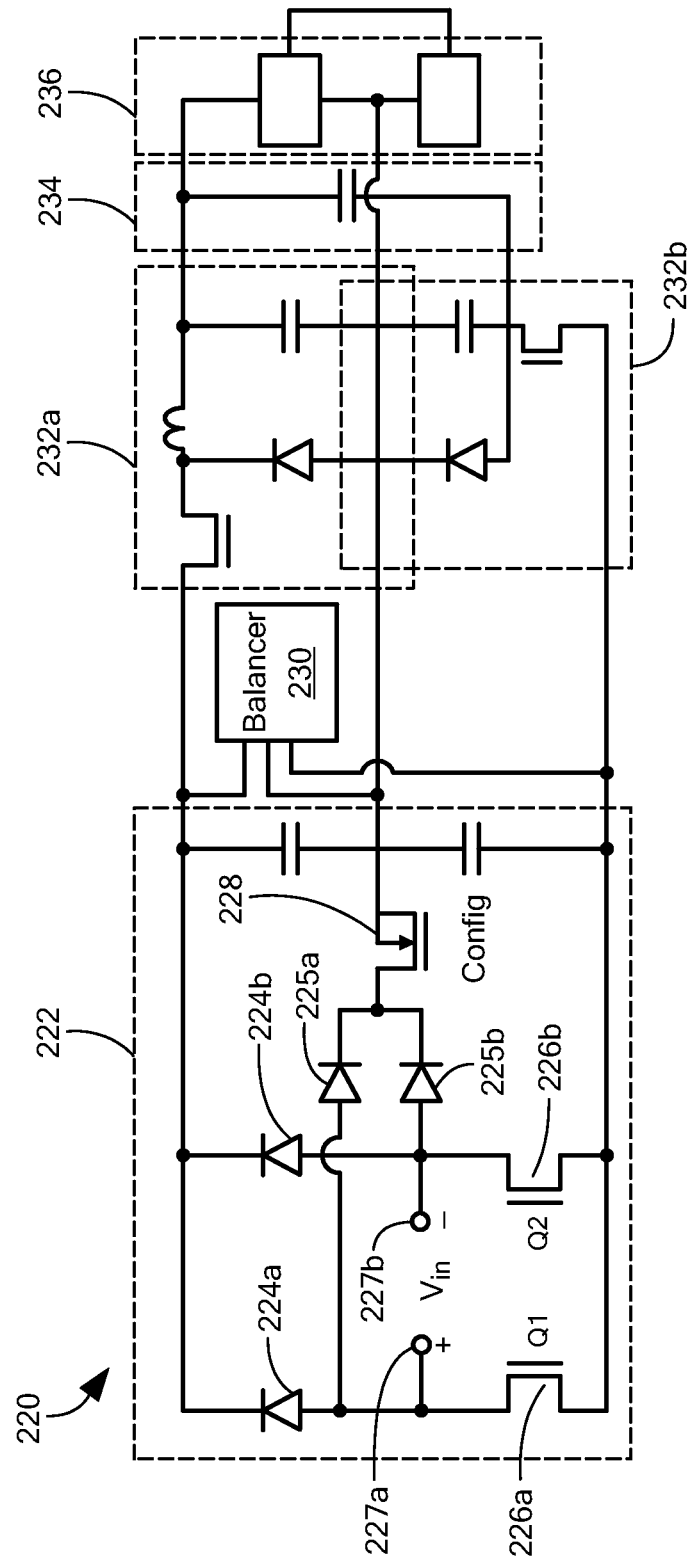

FIG. 11 shows another circuit 220 that can be used within a power converter. The illustrative circuit 220 includes a reconfigurable rectifier 222, a voltage balancer 230, two converters 232a and 232b, an energy buffer circuit 234, and a power combining and isolation circuit 236, which may be coupled as shown or in any other suitable manner.

It will be appreciated that the reconfigurable rectifier 222 utilizes a different design compared some of the circuits described above. For example, compared to the reconfigurable rectifier 42 of FIG. 2, the bottom two diodes 54c, 54d are replaced by active switches 226a, 226b (e.g., transistors) and two diodes 225a, 225b are added that will conduct only when a configuration switch 228 is closed. In the embodiment show, a first diode 225a is coupled between a first input terminal 227a and a first terminal 228a of the configuration switch 228, and a second diode 225b is coupled between a second input terminal 227b and the first terminal 228a of the configuration switch 228.

One benefit of this design is that it reduces the number of diode drops in the power path from two to one when the configuration switch 228 is open. Because diodes 225a and 225b are only used when the configuration switch is closed (which may correspond to low-voltage ac input), these diodes can be rated for lower voltage stress compared to the diodes 224a and 224b.

The active switches 226a, 226b can be configured to operate at substantially the same frequency as the ac input signal (i.e., the line frequency) and can have their source voltage referenced to a stable voltage. In some embodiments, the active switches 226a, 226b are driven by a controller, such as controller 22 of FIG. 1. In particular, switch 226a may be on during the negative half portion of the ac line cycle and switch 226b may be on during the positive portion of the ac line cycle.

Figure 12:
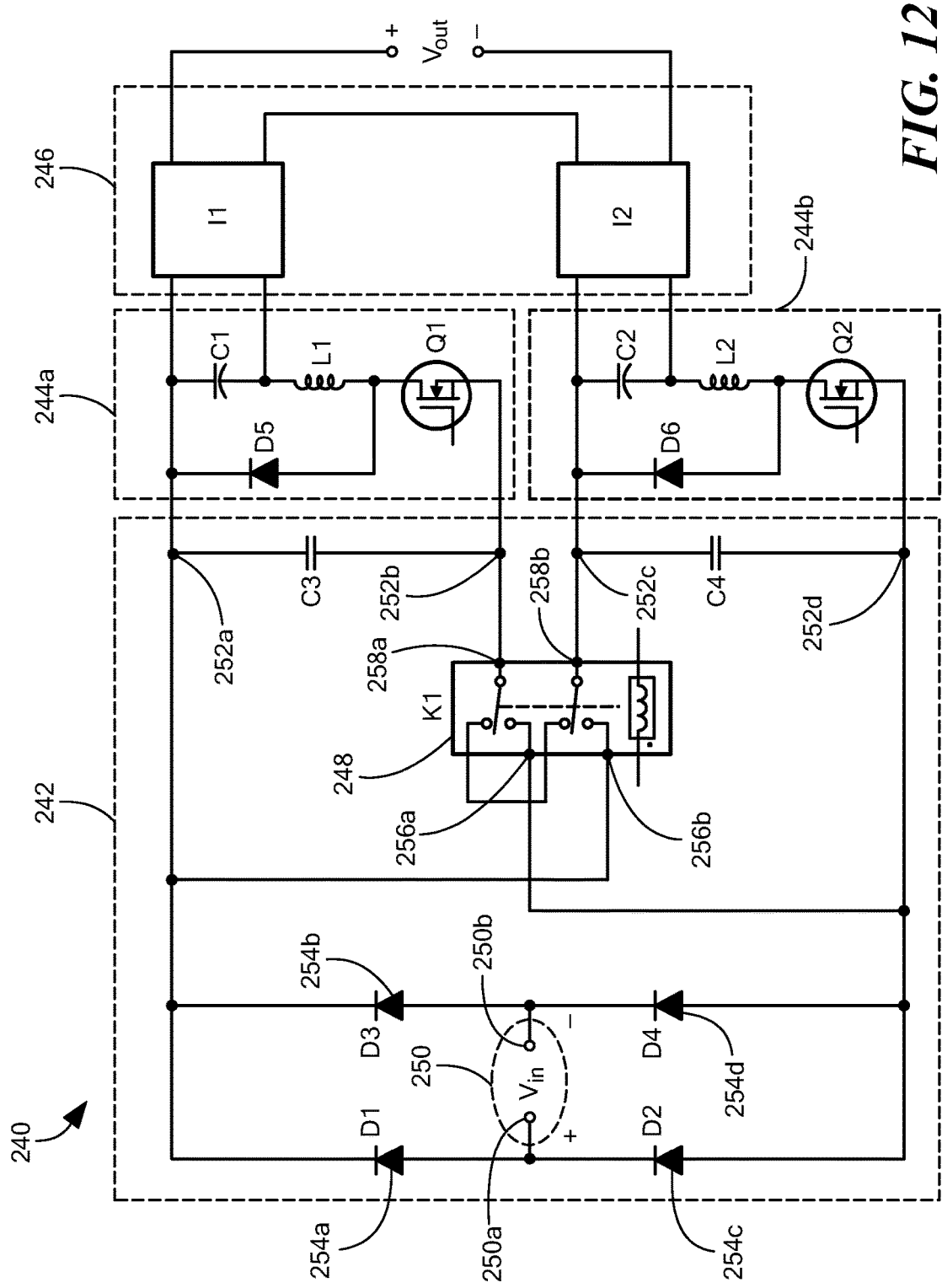

FIG. 12 shows another circuit 240 that can be used within a power converter. The illustrative circuit 240 includes a reconfigurable rectifier 242, two converters 244a and 244b, and a power combining and isolation circuit 246, which may be coupled as shown or in any other suitable manner.

The illustrative reconfigurable rectifier 242 includes first and second input terminals 250a and 250b (corresponding to an input port 250); four output terminals 252a-252d; a first diode 254a coupled in a forward direction between the first input terminal 250a and the first output terminal 252a; a second diode 254b coupled in a forward direction between the second input terminal 250b and the first output terminal 252a; a third diode 254c coupled in a reverse direction between the first input terminal 250a and the fourth output terminal 252d; a fourth diode 254d coupled in a reverse direction between the second input terminal 250b and the fourth output terminal 252d; and a relay 248 having a first input terminal 256a coupled to terminal 252d, a second input terminal 256b coupled to terminal 252a, a first output terminal 258a coupled to terminal 252b, and a second output terminal 258b coupled to terminal 252c.

The relay 258 is configured to connect the converters 244a either in series (as shown with the relay positions in FIG. 12) or in parallel. The series connection may be used for high voltage operation such as 240 Vac line voltage and the parallel connection may be used for low voltage operation such as 120 Vac. This eliminates the need for the voltage balancer circuit used in some of the other implementations. The relay 248 may be provided as a latching relay to reduce (and ideally eliminate) power dissipation. A non-latching relay or solid-state switches could also be used.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that scope of protection sought herein should not be limited to the described embodiments but rather should be limited only by the spirit and scope of the following claims.

The invention claimed is:

1. A circuit comprising:
a reconfigurable rectifier having an input port configured to receive an alternating current (ac) input signal and first, second, and third output ports, wherein in a first configuration the reconfigurable rectifier is configured to deliver power at the first output port and in a second configuration the reconfigurable rectifier is configured to deliver power to at least the second output port;
a voltage balancer having first and second input ports and first and second output ports, with the first and second input ports of the voltage balancer coupled to the second and third output ports of the reconfigurable rectifier and configured to balance a voltage at the first and second output ports;
a first converter having an input coupled to the first port of the voltage balancer and having an output at which a first converted voltage signal is provided;
a second converter having an input coupled to the second port of the voltage balancer and having an output at which a second converted voltage signal is provided; and
wherein, in the second configuration, the reconfigurable rectifier is configured to deliver power to the second output port, wherein the voltage balancer is configured to transfer power received from the second output port of the reconfigurable rectifier such that the first and second converters may process substantially equal power levels.

2. The circuit of claim 1 wherein, in the second configuration, the reconfigurable rectifier is configured to deliver power to the second and third output ports in alternating half ac cycles, wherein the voltage balancer is configured to transfer power received from the second and third output ports of the reconfigurable rectifier such that the first and second converters may process substantially equal power levels.

3. The circuit of claim 1 further comprising at least one configuration switch having a first state to place the reconfigurable rectifier in the first configuration and a second state to place the reconfigurable rectifier in the second configuration.

4. The circuit of claim 1 further comprising a controller, wherein in response to a value of the ac input signal, the controller places the configuration switch in the first or second state.

5. The circuit of claim 1 wherein the first and second converters are provided as buck converters.

6. The circuit of claim 5 wherein the first converter is provided as a resonant-transition buck converter and the second converter is provided as an inverted resonant-transition buck converter.

7. The circuit of claim 1 further comprising an energy buffer circuit network having an input coupled to the outputs of the first and second converters and at least one energy storage element, the energy buffer circuit network configured to provide buffering of twice-line-frequency energy.

8. The circuit of claim 7 wherein the outputs of the first and second converters are connected such that the energy buffer circuit network appears across the sum of the output voltages of the first and second converters.

9. The circuit of claim 7 wherein the at least one energy storage element comprises at least one capacitor.

10. The circuit of claim 7 wherein the energy buffer circuit network comprises three capacitors connected in a delta fashion.

11. A circuit comprising:
a reconfigurable rectifier having an input port configured to receive an alternating current (ac) input signal and first, second, and third output ports, wherein in a first configuration the reconfigurable rectifier is configured to deliver power at the first output port and in a second configuration the reconfigurable rectifier is configured to deliver power to at least the second output port;
a voltage balancer having first and second input ports and first and second output ports, with the first and second input ports of the voltage balancer coupled to the second and third output ports of the reconfigurable rectifier and configured to balance a voltage at the first and second output ports;
a first converter having an input coupled to the first port of the voltage balancer and having an output at which a first converted voltage signal is provided;
a second converter having an input coupled to the second port of the voltage balancer and having an output at which a second converted voltage signal is provided; and
wherein, in the second configuration, the reconfigurable rectifier is configured to deliver power to the second and third output ports in alternating half ac cycles, wherein the voltage balancer is configured to transfer power received from the second and third output ports of the reconfigurable rectifier such that the first and second converters may process substantially equal power levels.

12. The circuit of claim 11 wherein, in the second configuration, the reconfigurable rectifier is configured to deliver power to the second output port, wherein the voltage balancer is configured to transfer power received from the second output port of the reconfigurable rectifier such that the first and second converters may process substantially equal power levels.

13. The circuit of claim 11 further comprising at least one configuration switch having a first state to place the reconfigurable rectifier in the first configuration and a second state to place the reconfigurable rectifier in the second configuration.

14. The circuit of claim 11 further comprising a controller, wherein in response to a value of the ac input signal, the controller places the configuration switch in the first or second state.

15. The circuit of claim 11 wherein the first and second converters are provided as buck converters.

16. The circuit of claim 15 wherein the first converter is provided as a resonant-transition buck converter and the second converter is provided as an inverted resonant-transition buck converter.

17. The circuit of claim 11 further comprising an energy buffer circuit network having an input coupled to the outputs of the first and second converters and at least one energy storage element, the energy buffer circuit network configured to provide buffering of twice-line-frequency energy.

18. The circuit of claim 17 wherein the outputs of the first and second converters are connected such that the energy buffer circuit network appears across the sum of the output voltages of the first and second converters.

19. The circuit of claim 17 wherein the at least one energy storage element comprises at least one capacitor.

20. The circuit of claim 17 wherein the energy buffer circuit network comprises three capacitors connected in a delta fashion.

* * * * *